(12) United States Patent
Beyerle et al.

(10) Patent No.: US 11,135,763 B2
(45) Date of Patent: Oct. 5, 2021

(54) ASSEMBLIES FORMED BY ADDITIVE MANUFACTURING, RADAR ABSORBING STRUCTURES, AND RELATED METHODS

(71) Applicant: Northrop Grumman Systems Corporation, Falls Church, VA (US)

(72) Inventors: Peter A. Beyerle, Dayton, OH (US); Kenneth Johnson, Centerville, OH (US); Brett A. Poor, Beavercreek, OH (US); Talbot P. Thrasher, Newark, DE (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 388 days.

(21) Appl. No.: 15/969,005

(22) Filed: May 2, 2018

(65) Prior Publication Data

US 2019/0337220 A1 Nov. 7, 2019

(51) Int. Cl.
*B32B 3/12* (2006.01)
*B29C 64/118* (2017.01)
(Continued)

(52) U.S. Cl.
CPC ............ *B29C 64/118* (2017.08); *B33Y 10/00* (2014.12); *B33Y 70/00* (2014.12); *B33Y 80/00* (2014.12);
(Continued)

(58) Field of Classification Search
None
See application file for complete search history.

(56) References Cited

U.S. PATENT DOCUMENTS

| | | | | |
|---|---|---|---|---|
| 2,985,880 A | * | 5/1961 | McMillan | H01Q 15/08 343/910 |
| 4,635,071 A | * | 1/1987 | Gounder | H01Q 15/142 343/897 |

(Continued)

OTHER PUBLICATIONS

Chapter 16 Composites, Dec. 31, 2005, Materials Science and Engineering introduction Chapter 15 Composites 7th ed. (Year: 2005).*

(Continued)

*Primary Examiner* — Humera N. Sheikh
*Assistant Examiner* — Mary I Omori
(74) *Attorney, Agent, or Firm* — TraskBritt

(57) ABSTRACT

An assembly formed by additive manufacturing comprises a top face sheet, a bottom face sheet, and a core structure between the top face sheet and the bottom face sheet, the core structure comprising a plurality of cells, wherein structural elements of the core structure defining the plurality of cells exhibit at least one electrical property in at least one direction varying from at least one electrical property in a second, different direction and at least one structural property in at least one direction varying from at least one structural property in a second, different direction, wherein at least a portion of the structural elements comprises a radar absorbing structure, the structural elements comprising a matrix material and at least one additive dispersed in or on the matrix material. Related radar absorbing structures and related methods of fabricating the radar absorbing structures are also disclosed.

28 Claims, 11 Drawing Sheets

(51) Int. Cl.
  *B33Y 10/00* (2015.01)
  *B33Y 70/00* (2020.01)
  *H01Q 17/00* (2006.01)
  *B33Y 80/00* (2015.01)
  *B29K 105/16* (2006.01)

(52) U.S. Cl.
  CPC ....... *H01Q 17/00* (2013.01); *B29K 2105/162* (2013.01); *B29K 2995/0003* (2013.01)

(56) References Cited

U.S. PATENT DOCUMENTS

| | | | | |
|---|---|---|---|---|
| 5,727,619 | A * | 3/1998 | Yao | B64G 1/50 165/104.33 |
| 6,231,794 | B1 * | 5/2001 | Woldanski | B29C 44/0461 264/101 |
| 8,803,107 | B2 | 8/2014 | Delpech et al. | |
| 2005/0042416 | A1 * | 2/2005 | Blackmon | B32B 15/09 428/116 |
| 2007/0268173 | A1 * | 11/2007 | Randy | H01Q 17/008 342/2 |
| 2008/0135687 | A1 * | 6/2008 | Penzo | F42B 15/10 244/173.1 |
| 2012/0077052 | A1 | 3/2012 | Demetriou et al. | |
| 2015/0336292 | A1 | 11/2015 | Mikulak et al. | |
| 2016/0184898 | A1 * | 6/2016 | Kohav | G06T 17/00 426/512 |
| 2016/0237836 | A1 * | 8/2016 | Harris | F01D 25/24 |
| 2016/0263823 | A1 | 9/2016 | Espiau et al. | |
| 2017/0136694 | A1 | 5/2017 | Rezai et al. | |
| 2017/0204833 | A1 * | 7/2017 | Albert | F03D 1/0675 |
| 2017/0297262 | A1 | 10/2017 | Grigorian | |
| 2017/0368740 | A1 | 12/2017 | Rolland | |
| 2019/0032491 | A1 * | 1/2019 | Nissen | F01D 5/005 |

OTHER PUBLICATIONS

Faes et al., "Extrusion-based additive manufacturing of ZrO2 using photoinitiated polymerization" Article, CIRP Journal of Manufacturing Science and Technology 14 (2016) 28-34, 2016 CIRP.

Huang et al "Experimental Demonstration of Printed Graphene Nano-flakes Enabled Flexible and Conformable Wideband Radar Absorbers" Published Report, Scientific Reports, pp. 1-8, School of Electrical and Electronic Engineering, University of Manchester, Manchester, M13 9PL,, © The Author(s) 2016 UK.

Light Aircraft Association, Material Allowable Strength Data, 84 Pages, TL 1.16, Issue 7, Feb. 14, 2014.

Saleh et al., "3D inkjet-printed UV-curable inks for multi-functional electromagnetic applications" Research Article, Additive Manufacturing 13 (2017) 143-148, © 2016 Published by Elsevier B.V.

Thakre et al., Solid Propellants, Rocket Propulsion, vol. 2, Encyclopedia of Aerospace Engineering, John Wiley & Sons, Ltd. 2010.

Zhou et al. "Analysis and Design of Multilayered Broadband Radar Absorbing Metamaterial Using the 3-D Printing Technology-Based Method" Letter, IEEE Antennas and Wireless Propagation Letters, vol. 16, 2017, pp. 133-136, 1536-1225 © 2016 IEEE.

* cited by examiner

ASSEMBLIES FORMED BY ADDITIVE MANUFACTURING, RADAR ABSORBING STRUCTURES, AND RELATED METHODS

TECHNICAL FIELD

Embodiments of the disclosure relate generally to articles formed by additive manufacturing and exhibiting varying properties in one or more directions. More particularly, embodiments of the disclosure relate to articles formed by additive manufacturing and exhibiting varying electrical and structural properties in one or more directions, to related radar absorbing structures, and to related methods of forming the articles.

BACKGROUND

Aerospace structures (e.g., space shuttles, rockets, satellites, missiles, etc.), aircraft structures (e.g., airplanes, helicopters, etc.), military vehicle structures, or other structures may be exposed to hostile conditions characterized by high temperatures and turbulence during flight (e.g., launch, ascent, re-entry, etc.). Such structures are often formed of multiple components secured together or in adjacent relationship, and may require high strength properties, while maintaining a low density and weight. In addition, such structures may include electrical protection systems to protect the structure from damage that may be caused during flight, or may include electromagnetic shielding or radar absorbing structures.

In some instances, it is desired to control both the electrical properties and the structural properties of the structure. For example, in some instances, such as for low observable (LO) entities (i.e., so called "stealth technology"), it may be desired to perform electromagnetic signal manipulation. Accordingly, isolation, absorbance, deflection, or other methods of electromagnetic radiation signal manipulation are significant to avoidance of discovery of certain structures (e.g., military vehicles) by radar interrogation of adversaries. Currently, radar absorbing structures (RAS) are fabricated by coating a structural material such as a polymeric composite structure core with a material formulated to absorb electromagnetic radiation. In other instances, radar absorbing structures are fabricated by coating a reticulated foam with a coating material. However, such methods are costly and result in a lack of ability to control the consistency and uniformity of the final structure. For example, conventional radar absorbing structures are fabricated in block form and require multi-axis machining to form a final structure having a desired size, shape, and configuration, and exhibiting the desired properties. Such methods of forming radar absorbing structures are time consuming, have high scrap rates, and include expensive electrical verification steps due. In addition, multi-axis machining results in structures having high topographical variations (e.g., high surface roughness), such as over about 0.635 mm (0.025 inch) variation in surface roughness (i.e., a root mean square surface roughness of RMS 635 µm, a relatively high value for surface roughness). Unfortunately, the effectiveness of radar absorbing structures is reduced with variations in surface definition (e.g., with increasing surface roughness).

BRIEF SUMMARY

Embodiments disclosed herein include articles formed by additive manufacturing and exhibiting varying electrical and structural properties in one or more dimensions, to related radar absorbing structures, and to related methods of forming the articles. For example, in accordance with one embodiment, an assembly formed by additive manufacturing comprises a top face sheet, a bottom face sheet, and a core structure between the top face sheet and the bottom face sheet, the core structure comprising a plurality of cells, wherein structural elements of the core structure defining the plurality of cells exhibit at least one electrical property in at least one direction varying from at least one electrical property in a second, different direction and at least one structural property in at least one direction varying from at least one structural property in a second, different direction, wherein at least a portion of the structural elements comprises a radar absorbing structure, the structural elements comprising a matrix material and at least one additive dispersed in the matrix material. Using additive manufacturing facilitates fabrication of weight efficient structures along with voxel by voxel (e.g., cell by cell) control of electrical properties within the structure and/or article.

In additional embodiments, a method of fabricating a radar absorbing structure comprises forming a first layer of a structure comprising a plurality of cells defined by structural elements. Forming the first layer comprises disposing a first filament segment comprising one or more additives dispersed in a matrix material on at least a portion of a platen, and disposing a second filament segment comprising one or more additives dispersed in a matrix material on at least other portions of the platen, the second filament segment exhibiting different electrical properties than the first filament. The method further comprises forming a second layer of the structure on the first layer, forming the second layer comprising disposing another segment of the first filament on at least a portion of the first layer, and disposing another segment of the second filament on at least other portions of the second layer to form the structure comprising the plurality of cells, wherein the structure elements comprise at least one structural property changing in at least one direction and at least one electrical property changing in the at least one direction In further embodiments, a radar absorbing structure comprises a core comprising at least one layer of a lattice structure comprising a plurality of cells arranged in a lattice, the cells of the plurality of cells defined by structural elements, wherein the structural elements exhibit at least one changing electrical property along at least one axis of the core and at least one changing structural property along at least one axis of the core, the structural elements comprising at least one additive material dispersed throughout a matrix material.

DETAILED DESCRIPTION

Figure 1:
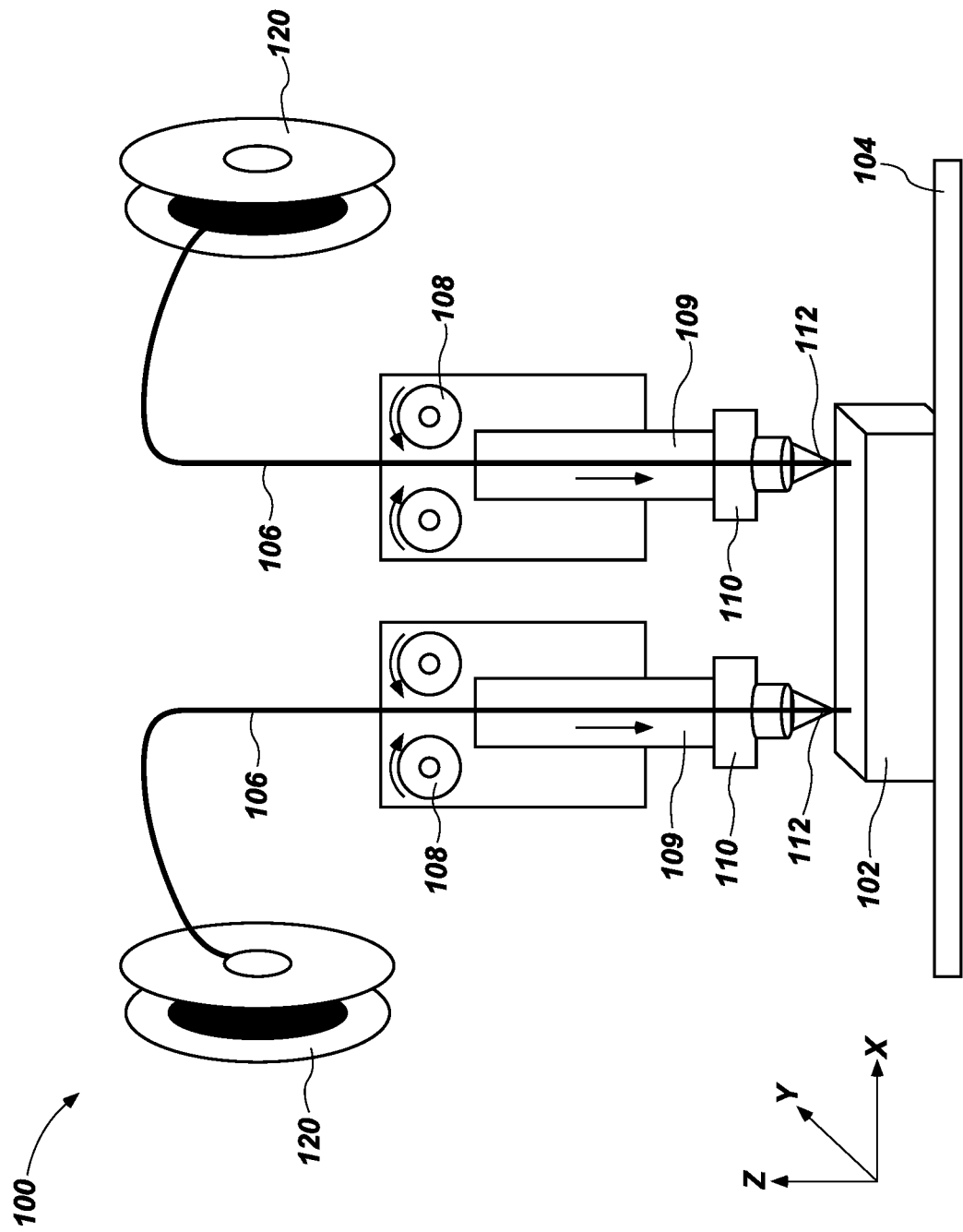
FIG. 1 is a simplified perspective view of a tool for forming articles by additive manufacturing, in accordance with embodiments of the disclosure.

Illustrations presented herein are not meant to be actual views of any particular material, component, or system, but are merely idealized representations that are employed to describe embodiments of the disclosure. Additionally, elements common between figures may retain the same numerical designation for convenience and clarity.

The following description provides specific details, such as material types, compositions, material thicknesses, and processing conditions in order to provide a thorough description of embodiments of the disclosure. However, a person of ordinary skill in the art will understand that the embodiments of the disclosure may be practiced without employing these specific details. Indeed, the embodiments of the disclosure may be practiced in conjunction with conventional techniques employed in the industry. In addition, the description provided below does not form a complete process flow for forming an article by additive manufacturing. Only those process acts and structures necessary to understand the embodiments of the disclosure are described in detail below. Additional acts or materials to form an article by additive manufacturing may be performed by conventional techniques.

As used herein, the term "electromagnetic property" means and includes one or more of an absorption property of electromagnetic radiation at one or more wavelengths (e.g., a capacity to absorb electromagnetic radiation at one or more wavelengths, such as at radio frequency wavelengths), a reflective property of electromagnetic radiation at one or more wavelengths, attenuation of electromagnetic radiation (e.g., scattering of electromagnetic radiation), or combinations thereof. As used herein, the term "electrical property" means and includes an electromagnetic property, an electrical conductivity, an electrical resistivity, a dielectric property, or combinations thereof As used herein, the term "axis" is a directional indicator specific to an article described or being formed. For example, an article formed according to embodiments of the disclosure may be elongated in a particular direction, and such direction may be characterized as the "z" axis, perpendicular to which may lie the "X" and the "Y" axes which are themselves mutually perpendicular. Accordingly, the terms "axis" and "axes" as used herein may define specific directional orientations of structural and electrical properties of an article. In addition, it will be understood by those of ordinary skill in the art that an axis other than the aforementioned X, Y, and Z may be uniquely characterized by reference to two or more of the X, Y, and Z axes. For example, a unique axis may be defined as lying at a 30° angle to the Z axis and a 10° angle to the X axis. In other words, the unique axis may not be mutually orthogonal to one or more of (e.g., to any of) the X axis, the Y axis, or the Z axis. In other words, a unique axis may extend in a direction such that different locations along the unique axis may be defined by more than one of a changing x-value, a changing y-value, or a changing z-value.

As used herein, the term "layer" is used to reference manufacturing techniques according to embodiments of the disclosure is to be taken in a broad sense to reference a material or materials deposited or formed at a particular level, or elevation, above a reference plane and not to require that such material or materials form a continuous, unbroken layer or that such material or materials deposited at a particular elevation are necessarily of uniform thickness or height. In other words, a "layer" may comprise a discontinuous mass of a material or materials deposited at a particular level, and of a non-uniform thickness or height at such level.

According to embodiments disclosed herein, an article (e.g., a low observable structure) may be formed by additive manufacturing and one or more properties of the article may be tailored (e.g., configured, adjusted, modified, varied, etc.) in one or more selected directions. In other words, one or more properties of the article so formed may change in one or more directions, such as along an axis of the article (e.g., along one or more of a height, a width, or a length of the article, a direction in which one or more of the height, width, or length of the article changes). As used herein, a property changing in one or more directions may include a property changing in a direction that is not mutually perpendicular to a so-called x-axis, y-axis, or z-axis. For example, electrical properties (e.g., electromagnetic properties, such as radar absorption capacity) and structural properties (e.g., density, cell size, cell density, cell pitch, cell geometry, shear strength, compressive strength, tensile strength, another property, etc.) may be tailored in one or more directions. Accordingly, the article may exhibit a changing electromagnetic property and at least one changing physical property in one or more directions. In some embodiments, the article may exhibit at least one electrical property in at least one direction varying from at least one electrical property in a second, different direction and at least one structural property in at least one direction varying from at least one structural property in a second, different direction. The article may be formulated and configured to exhibit anisotropic properties, such as radar absorption properties in one direction (e.g., along one axis of the article), but not in other directions. In other words, the article may adsorb electromagnetic radiation in the radio wavelengths in one direction, but not in other directions.

The article may be formed by additive manufacturing techniques, such as by one or more of fused filament fabrication (FFF), fused deposition modeling (FDM), stereolithography (SLA), binder jet 3D printing (also referred to as binder jetting), inkjet printing, selective laser sintering (SLS), or other additive manufacturing process suitable for fabrication of the article in question. In some embodiments, the article is formed by fused filament fabrication. The article so formed may include a core comprising a plurality of cells (such as cells arranged in a honeycomb structure), a lattice structure, or another structure. In some such embodiments, the core may be disposed between face sheets attached to one or more sides of the core. The core may comprise a matrix material, at least a portion of which matrix material may include one or more additives dispersed therein. The core may exhibit varying electrical properties and varying structural properties in one or more directions, such as along one or more axes thereof In some embodiments, the core comprises different concentrations of the one or more additives along one or more axes thereof In other embodiments, the core exhibits a changing cell density along one or more axes thereof and cells of the core are coated with a material exhibiting desired electrical properties (e.g., radar absorbing properties, electrical conductivity, electrical resistivity, combinations thereof, etc.). The changing cell density may facilitate changing electrical properties and structural properties of the core in the one or more directions (e.g., along the one or more axes of the core). In some embodiments, one or more channels may be formed in the core. The one or more channels may include one or more of cables, wiring, conduits, circuit elements, antennas, beams, another component for altering electromagnetic radiation, another component, or combinations thereof In some embodiments, at least a portion of the article may be configured to house an antenna and may be referred to herein as a radome structure.

In some embodiments, the article may include a plurality of structural elements defining a plurality of cells to form an open cell structure, a closed-cell structure, or a structure including a combination of open cells and closed cells. The structural elements defining the cells may exhibit changing electrical and structural properties in at least one direction. For example, the structural elements may exhibit at least one electrical property in at least one direction varying from at least one electrical property in a second, different direction and at least one structural property in at least one direction varying from the at least one structural property in a second, different direction. The articles formed according to embodiments of the disclosure may include a plurality of cells defined by the structural elements exhibiting the varying properties in one or more directions. Conventional articles formed by 3D printing may not include both changing electrical and structural properties in structural elements thereof.

The article may be used in, for example, a radar absorbing structure, in low observable (LO) entities (such as in so-called "stealth technology"), or in other structures. By way of nonlimiting example, the article may be used in aircraft edges (e.g., wing edges), panels, ship masts, chine structures (i.e., the location of a change in angle of the cross-section of a hull of a ship), vehicle covers, aerospace structures, naval structures, trailerable vehicles, stable inhabited or covering structures, test range obfuscators, any structure or device where electromagnetic shielding is desired, another structure, or combinations thereof. As will be described herein, since the article is fabricated by additive manufacturing, the article may be fabricated to exhibit tunable electrical properties (e.g., radar absorbing properties) and structural properties in one or more directions, wherein, in at least some embodiments, the tunable properties are exhibited in the structural elements defining cells of the article.

FIG. 1 is a simplified schematic of a tool 100 for forming one or more articles, in accordance with embodiments of the disclosure. The tool 100 may be configured to additively manufacture an article 102. The tool 100 may be referred to herein for the sake of simplicity as a 3D printer and may be configured to form the article 102 one layer at a time. In some embodiments, the tool 100 may comprise, for example, a fused deposition modeling tool or a fused filament fabrication tool.

The tool 100 may include a table (e.g., a platen) 104 on which the article 102 to be manufactured with the tool 100 is disposed. One or more extrusion heads 110 may be configured to provide a filament 106 to an uppermost surface of the article 102. The extrusion heads 110 may be in operable communication with a respective extruder 109. Each extrusion head 110 may include, for example, one or more rollers 108 (e.g., drive wheels) configured to extrude and pull the filament 106 and provide the filament 106 to the article 102 through the extrusion head 110. A nozzle 112 may be associated with each of the extrusion heads 110 and configured to provide the filament 106 to the article 102. The nozzles 112 may be configured to deliver thin beads of the filament 106 to the upper surface of the article 102.

Each of the extrusion heads 110 may be in operable communication with one or more spools 120 comprising the filament 106. In some embodiments, each spool 120 comprises a filament 106 having a different composition than the filament 106 in the other spools 120.

In use and operation, the filament 106 may be fed to the extrusion head 110 with the rollers 108. In some embodiments, each of the extrusion heads 110, each of the nozzles 112, or both may include a heater (e.g., a resistive heater) configured to maintain a desired temperature of the filament 106 and to maintain a flowability of the filament 106 through the nozzle 112.

The nozzles 112 and associated extrusion heads 110 may be configured to move in at least the x and y directions to deposit the filament 106 having a desired composition on the upper surface of the article 102. The filament 106 may be deposited at desired locations on the upper surface of the article 102 and may harden upon deposition on the upper surface of the article 102.

After a current layer on the upper surface of the article 102 is formed, one or both of the article 102 and the extrusion heads 110 and nozzles 112 may be moved relative to each other in the z-direction. For example, the table 104 may be configured to move in the z-direction. In other embodiments, the extrusion heads 110 and nozzles 112 may be configured to move in the z-direction. In some embodiments, the table 104 may be configured to move in the z-direction a distance corresponding to a thickness of the previously formed layer of material of the article 102.

As described above, the filament 106 in each of the spools 120 may comprise different materials. In some such embodiments, each filament 106 may exhibit different electrical properties, such as electromagnetic absorption properties, reflectivity of electromagnetic radiation, electrical conductivity, electrical resistivity, dielectric constant, etc. The filaments 106 may exhibit different structural properties, such as compressive strength, tensile strength, shear strength, density, melting temperature, etc.

The filament 106 may comprise a matrix material and one or more additives dispersed throughout the matrix material. In some embodiments, at least one of the filaments 106 may include only a matrix material without any additives dispersed therein. The matrix material may comprise, for example, a thermoplastic, a thermopolymer, or another material. In some embodiments, the matrix material comprises acrylonitrile butadiene styrene (ABS), polyacetic acid (PLA), polylactic acid, high-impact polystyrene (HIPS), thermoplastic polyurethane (TPU), aliphatic polyamides (nylon), polyether ether ketone (PEEK), another material, or a combination thereof. In other embodiments, the matrix material may comprise a polymeric material (e.g., an epoxy material; a thermoplastic polymer material, such as one or more of a polyethylene (PE) material, a polypropylene (PP) material, a polystyrene (PS) material, a polyvinyl chloride (PVC) material, a poly(methyl methacrylate) (PMMA) material, a polycarbonate (PC) material, a polyphenylene oxide (PPO) material, a polyetherketone (PEK) material, a polyetheretherketone (PEEK) material, a polyaryletherketone (PAEK) material, a polyetherketoneketone (PEKK) material, a polyetherketoneetherketoneketone (PEKEKK) material, a polyether sulfone (PES) material, a polyphenylene sulfide (PPS) material, a polyphenylsulfone (PPSU) material, a polyphenylene material, an aromatic polyamide (PA) material, and a polyamideimide (PAI) material; thermoset plastic materials, such as one or more of an epoxy, bismaleimide, a cyanate ester, polyimide (PI) material, a preceramic polymer, such as one or more of a polysiloxanes, polysilazane, polycarbosilane and polysilsesquioxane, a polyurethane (PU) material, a phenol-formaldehyde material, a urea-formaldehyde material, and a polyester material), a glass material, a carbon-containing material, a boron-containing material, or other thermoplastic or thermosetting material.

The additives may be formulated and configured to affect (i.e., alter) electrical properties and structural properties of the article 102. For example, different additives may exhibit different radar absorption capabilities and may further exhibit different structural properties when dispersed in the matrix material.

The additives may include one or more of nanotubes (e.g., carbon nanotubes (CNTs) (e.g., single wall carbon nanotubes (SWCNTs), multi-walled carbon nanotubes (MWCNTs)), tungsten sulfide ($WS_2$) nanotubes, molybdenum sulfide ($MoS_2$) nanotubes, tin sulfide ($SnS_2$) nanotubes, titanium dioxide ($TiO_2$) nanotubes, zirconium dioxide ($ZrO_2$) nanotubes, zinc oxide (ZnO) nanotubes, carbon nitride nanotubes, aluminum nanotubes, etc.), carbon black, a glass-containing material (e.g., glass fibers (e.g., fibers of silicon dioxide)), carbon fibers, ceramic fibers (e.g., oxide-based ceramic fibers, such as one or more of alumina fibers, alumina-silica fibers, and alumina-boria-silica fibers; non-oxide-based ceramic fibers, such as one or more of silicon carbide (SiC) fibers, silicon nitride (SiN) fibers, etc.), other fibers, silicon carbide particles, particles (e.g., nanoparticles) of one or more of nickel, iron, cobalt, iron, carbon, silicon, etc., nanostrands (e.g., nanostrands of one or more of nickel, iron, cobalt, iron, carbon, silicon, etc.), or combinations thereof. In other embodiments, the additive may include one or more fibers, such as carbon fibers, ceramic fibers.

The concentration of the additives in the matrix may be between about 0.1 weight percent and about 80.0 weight percent, such as between about 0.1 weight percent and about 0.5 weight percent, between about 0.5 weight percent and about 1.0 weight percent, between about 1.0 weight percent and about 2.0 weight percent, between about 2.0 weight percent and about 5.0 weight percent, between about 5.0 weight percent and about 10.0 weight percent, between about 10.0 weight percent and about 20.0 weight percent, between about 20.0 weight percent and about 30.0 weight percent, between about 30.0 weight percent and about 40.0 weight percent, between about 40.0 weight percent and about 60.0 weight percent, or between about 60.0 weight percent and about 80.0 weight percent. In some embodiments, the concentration of the additives in the matrix may be between about 5.0 weight percent and about 15.0 weight percent. In some embodiments, the concentration of the additives in the matrix may affect the structural and the electrical properties of the article 102.

Since the tool 100 includes more than one extrusion head 110 and nozzle 112, the tool 100 may include filaments 106 exhibiting different structural and electrical properties. Accordingly, the article 102 may be formed to exhibit varying properties (e.g., structural and electrical properties) in at least one of the x-direction, the y-direction, or the z-direction.

Accordingly, in some embodiments, the different filaments 106 configured to be extruded through the different extruders 109 may comprise a different concentration of one or more additives, or may comprise different additives. As will be described herein, varying the additive and the concentration of one or more additives along one or more directions (e.g., axes) of the article 102 may form an article 102 exhibiting varying structural and electrical properties along the one or more directions.

In some embodiments, the tool 100 may be in operable communication with a processor having associated therewith a memory including instructions configured to direct each of the extrusion heads 110 and nozzles 112 to locations where the filament should be provided to form the article 102 having a desired size and shape. By way of nonlimiting example, the memory may include data for formation of a desired structure in the form of a computer-aided-design (CAD) model or a computer-aided-manufacturing (CAM) model configured to direct the extrusion heads 110, nozzles 112, and table 104.

In some embodiments, the tool 100 may include topology optimization (TO) software for optimizing a material layout within a given set of loads, boundary conditions, and constraints with the goal of maximizing the performance of the system. In some such embodiments, the processor may be configured to form an article 102 having desired properties and configuration based on inputs by a user (such as desired electrical properties, structural properties, etc.).

Although FIG. 1 illustrates only two filaments 106 and two extrusion heads 110 and nozzles 112, the disclosure is not so limited. In other embodiments, the tool 100 includes three types of filaments 106 and associated extrusion heads 110 and nozzles 112. In yet other embodiments, the tool 100 comprises four, five, six, seven, eight, etc., types of filaments 106 and associated extrusion heads 110 and nozzles 112 to form the article 102 having desired properties in one or more directions.

Although the tool 100 has been illustrated as comprising the spools 120 of the filament 106, the disclosure is not so limited. In other embodiments, the tool 100 comprises one or more hoppers in operable communication with each of the extrusion heads 110. Pellets comprising the filament 106 material having desired electrical and structural properties may be disposed in the hopper associated with each extrusion head 110. The pellets may be fed to an associated extrusion head 110 and disposed on the article 102 through a respective nozzle 112. Each hopper may include pellets having a different composition than the pellets of the other hoppers. In some embodiments, the hopper may include a polymer bath comprising the matrix material and one or more additives dispersed therein. The tool may include a plurality of hoppers including one or more of different polymers, different additives, and different concentrations of additives in fluid communication with different extrusion heads 110 and nozzles 112.

Similarly, although the tool 100 has been described as comprising the spools 120 of filament 106 having a different composition, the disclosure is not so limited. In other embodiments, the tool 100 may include a single extrusion head 110 and nozzle 112 and the filament 106 fed to the extrusion head 110 may exhibit a substantially uniform composition. In some such embodiments, the extrusion head 110 may be in operable communication with one or more additives configured to be mixed with the filament 106 in the extrusion head 110 when the filament 106 is heated and in a melted configuration. In some such embodiments, different additives may be added to the extrusion head 110 and the filament 106 therein to alter the structural and electrical properties of the filament 106 deposited on the article 102 through the nozzle 112. Since the filament 106 is heated in the extrusion head, the additives may be substantially mixed with the filament 106 prior to deposition on the article 102.

As will be described herein, the tool 100 may be configured to form articles for aerospace structures (e.g., space shuttles, rockets, satellites, missiles, etc.), aircraft structures (e.g., airplanes, helicopters, etc.), military vehicle structures, or other structures, wherein the articles exhibit desired structural and electrical properties (e.g., aerospace grade properties). In some embodiments, the article 102 may comprise a component of one or more of an aerospace structure, an aircraft edge, an aircraft panel, a ship mast, a chine structure, a vehicle cover, a portion of a ship, a test range obfuscator, an electromagnetic shield for any such structure, a radome structure, or combinations thereof. Since the article 102 is formed layer by layer in the tool 100, the article 102 may be formed to exhibit desired structural and electrical properties at different locations thereof and may be configured to exhibit different structural and electrical properties in one or more directions, such as by tailoring such properties based on the composition and of the filaments 106 and additives used therein. In some embodiments, structural components of the article 102 (e.g., such as structural components of open-celled structures, closed-cell structures, or both) are formed to exhibit the varying structural and electrical properties.

Figure 2A:
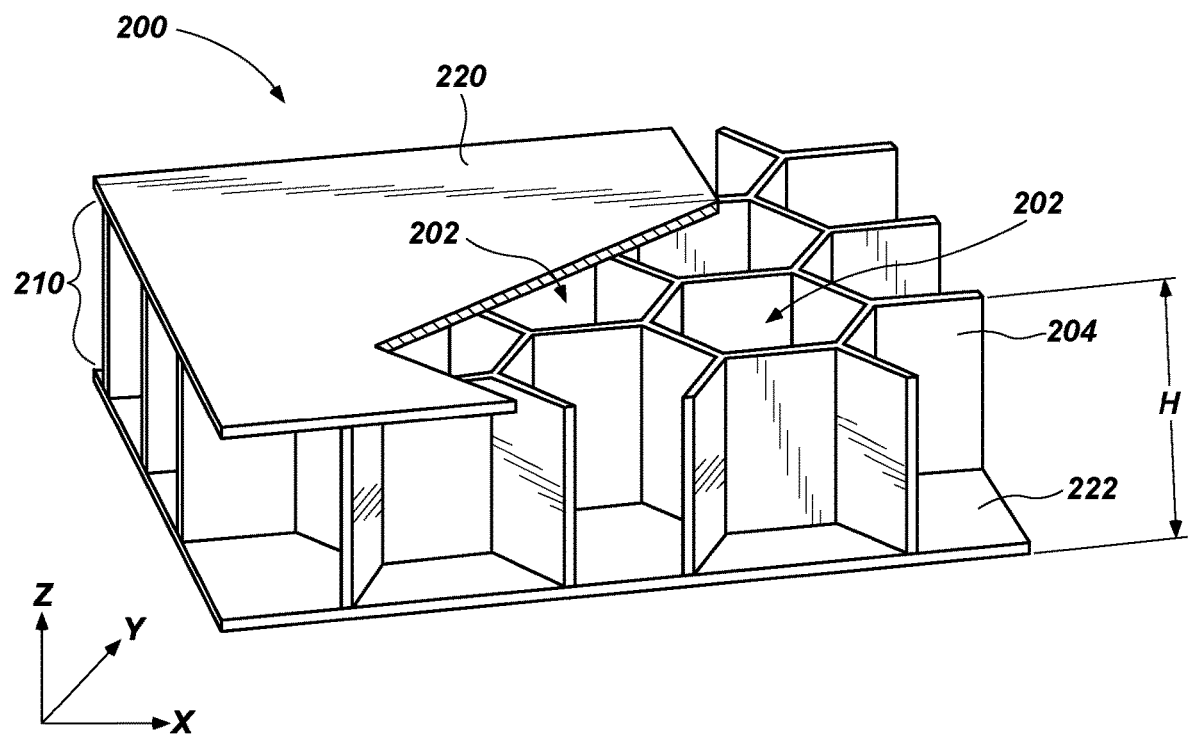
FIG. 2A and FIG. 2B are a respective simplified cutaway perspective view and a planar cross-sectional view of an article, in accordance with embodiments of the disclosure.
Figure 2B:
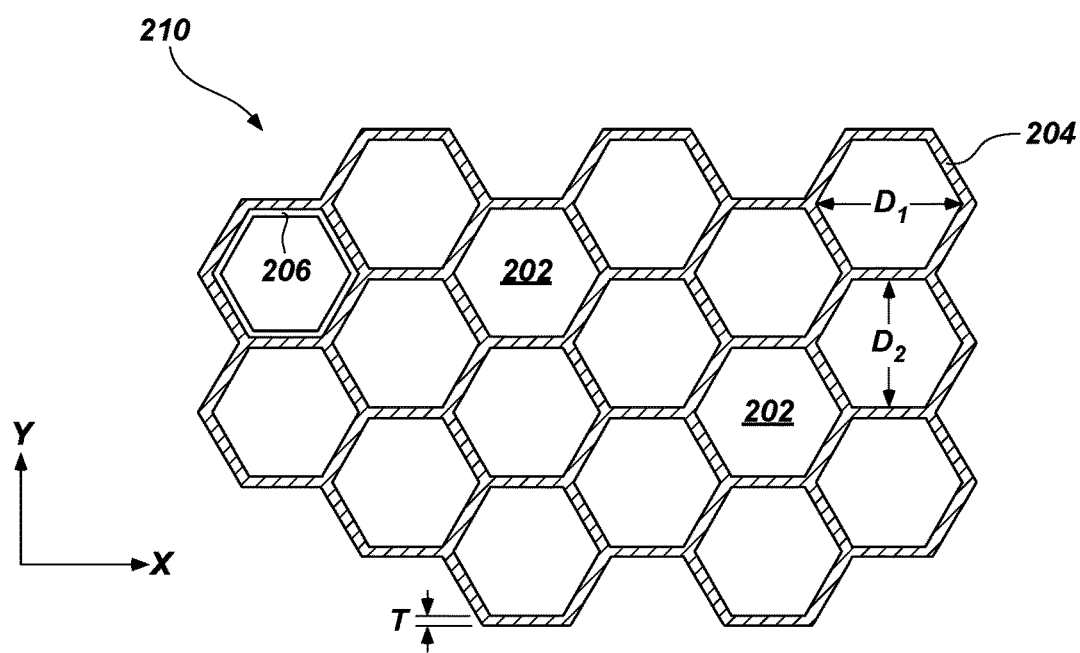

FIG. 2A and FIG. 2B are a respective simplified cutaway perspective view and a planar cross-sectional view of an article 200, according to embodiments of the disclosure. The article 200 may include a core 210, a top face sheet 220, and a bottom face sheet 222. The top face sheet 220 and the bottom face sheet 222 may be attached to the core 210, such as by curing or bonding with, for example, an epoxy material. The core 210 may be disposed between the top face sheet 220 and the bottom face sheet 222. Since the core 210 is disposed between the top face sheet 220 and the bottom face sheet 222, the article 200 may be referred to herein as a "sandwich-structure."

The top face sheet 220 and the bottom face sheet 222 may independently comprise aluminum, fiberglass, carbon fiber, aramid fibers, another material, or combinations thereof In some embodiments, the top face sheet 220 and the bottom face sheet 222 comprise the same material. In other embodiments, the top face sheet 220 and the bottom face sheet 222 comprise different materials.

The core 210 may include a plurality of cells 202. In some embodiments, cells 202 may be arranged in a pattern. In other embodiments, the cells 202 may be randomly oriented in the core 210. In some embodiments, each cell 202 may have substantially the same dimension and shape. In the embodiment illustrated in FIG. 2A and FIG. 2B, the cells 202 have a hexagonal shape and the core 210 may be referred to herein as a "honeycomb" core. However, the disclosure is not so limited and the cells 202 may be a different shape, such as triangular, rectangular, square, diamond, circular, oval, pentagonal, octagonal, etc. In some embodiments, at least some of the cells 202 may exhibit a first shape and at least some of the cells 202 may exhibit a different shape.

The core 210 may have a height or thickness H defined as a distance between the top face sheet 220 and the bottom face sheet 222. By way of nonlimiting example, the height may be between about 0.1 mm and about 100 mm, such as between about 0.1 mm and about 0.5 mm, between about 0.5 mm and about 1.0 mm, between about 1.0 mm and about 5.0 mm, between about 5.0 mm and about 10.0 mm, between about 10.0 mm and about 25.0 mm, between about 25.0 mm and about 50.0 mm, or between about 50.0 mm and about 100.0 mm. However, the disclosure is not so limited and the height may be different than those described above.

With reference to FIG. 2B, each cell 202 may be defined by walls 204 forming structural elements of the core 210. With reference to FIG. 2A and FIG. 2B, each cell 202 may have a dimension $D_1$ defining a size, such as, for example, a width of the cell 202. In some embodiments, the dimension $D_1$ of the cells 202 may be substantially uniform along one or more axes of the article 200. In other embodiments, as will be described herein, the core 210 may include cells 202 of varying size along at least one axis of the article 200. In some such embodiments, at least some of the cells 202 have a first size and at least other of the cells 202 have a second size.

A dimension $D_2$ of the cells 202 may define, for example, a length of the cells 202. In some embodiments, the dimension $D_2$ of the cells 202 may be substantially uniform along one or more axes of the article 200. In some embodiments, as will be described herein, the core 210 may include cells 202 of varying size along at least one axis of the article 200. In some such embodiments, at least some of the cells 202 have a first size and at least other of the cells 202 have a second size.

Each of the dimension $D_1$ and the dimension $D_2$ may independently be between about 0.5 mm and about 25.4 mm, such as between about 0.5 mm and about 1.0 mm, between about 1.0 mm and about 1.5 mm, between about 1.5 mm and about 2.0 mm, between about 2.0 mm and about 2.5 mm, between about 2.5 mm and about 3.0 mm, between about 3.0 mm and about 4.0 mm, between about 4.0 mm and about 5.0 mm, between about 5.0 mm and about 7.5 mm, between about 7.5 mm and about 10.0 mm, between about 10.0 mm and about 15.0 mm, between about 15.0 mm and about 20.0 mm, or between about 20.0 mm and about 25.4 mm. In some embodiments, $D_1$ is equal to about $D_2$. In other embodiments, dimension $D_1$ is greater than $D_2$. In yet other embodiments, $D_2$ is greater than $D_1$.

In some embodiments, a thickness T of the walls 204 of each cell 202 may be substantially uniform. In other words, the thickness T of the walls 204 may be substantially the same for each of the cells 202. By way of nonlimiting example, the thickness T may be between about 10 µm and about 200 µm, such as between about 10 µm and about 50 µm, between about 50 µm and about 100 µm, or between about 100 µm and about 200 µm However, the disclosure is not so limited and the thickness T may be different than those described above. Further, the thickness T of a wall of a cell 202 in one direction may be different than the thickness T in another direction. In other words, wall thickness T may be different for two or more walls of a single cell 202. In some embodiments, the thickness T of the walls 204 may change in one or more directions.

The core 210 may exhibit varying properties in one or more directions, such as along one or more axes of the article 102 (i.e., along one or more of the x-axis, the y-axis, or the z-axis). In some embodiments, one or more of the cell size, cell density, pitch, or another property may change along one or more of the axes to vary one or more properties along the one or more axes. In some embodiments, structural elements of the core 210, such as the cell walls 204, may exhibit varying properties in one or more directions. For example, the cell walls 204 may exhibit a varying structural property in at least a first direction and a varying electrical property in at least a second direction, which may be the same or different from the first direction.

The core 210 may comprise a matrix material and one or more additives dispersed throughout the matrix material. The matrix material and the additives may be substantially the same as described above with reference to the filament 106 (FIG. 1). The additives may be formulated and configured to affect electromagnetic properties and structural properties of the core 210. For example, different additives may exhibit different radar absorption capabilities and may further exhibit different structural properties when dispersed in the matrix material. The concentration of the additives throughout the matrix material may be the same as described above with reference to the filament 106. In some embodiments, a concentration of the additives in the matrix material may vary along one or more directions of the article 200, such as along one or more axes (e.g., one or more of the x-axis, the y-axis, or the z-axis, etc.) of the article 200. In some such embodiments, the concentration of the additives in the matrix material may vary in the structural elements of the core 210 alone one or more axes thereof.

In some embodiments, at least some of the cells 202 may include a coating 206 over at least some surfaces thereof. Although the coating 206 is illustrated in FIG. 2B only on an interior surface of one cell 202 for clarity, it will be understood that the coating 206 may overlie inner surfaces of the substantially all of the cells 202. In some embodiments, the coating 206 may be located only on external surfaces (i.e., a periphery) of the core 210. In other embodiments, the coating 206 may be located only on interior surfaces of the cells 202. In some embodiments, the core 210 may include a coating 206 on external surfaces of the core 210 and on internal surfaces of the cells 202, wherein the coating 206 on external surfaces of the core 210 comprises a different material than the coating 206 on interior surfaces of the cells 202. By way of nonlimiting example, the coating 206 on external surfaces of the core 210 may exhibit electrical conductivity while the coating 206 on interior surfaces of the cells 202 may exhibit radar absorption properties. In other embodiments, the coating 206 on external surfaces of the core 210 may exhibit radar absorption properties while the coating 206 on interior surfaces of the cells 202 may exhibit electrical conductivity. In further embodiments, the coating 206 on external surfaces of the core 210 may exhibit one of electrical conductivity and electrically insulative properties while the coating 206 on interior surfaces of the cells 202 may exhibit the other of electrical conductivity and electrically insulative properties.

The coating 206 may comprise a material formulated and configured to exhibit a desired electrical property. For example, the coating 206 may exhibit a desired electrical conductivity, a desired electrical resistivity, a desired electromagnetic shielding property, a desired absorption of electromagnetic radiation at a desired frequency range (e.g., radio frequency range), a desired reflectivity of electromagnetic radiation at a desired frequency range, or combinations thereof. The coating 206 may be formulated and configured to exhibit one or more tunable electrical properties. The coating 206 may include any of the materials described above with reference to the filament 106 (FIG. 1), such as a matrix material with one or more additives therein. In some embodiments, the coating 206 may exhibit uniform electrical properties along a dimension of the cell core 210. In other embodiments, the coating 206 may exhibit varying electrical properties in at least one direction. In some such embodiments, a composition of the coating 206, a concentration of additives in the coating 206, types of additives in the coating 206, or combinations thereof may vary in the at least one direction.

Figure 2C:
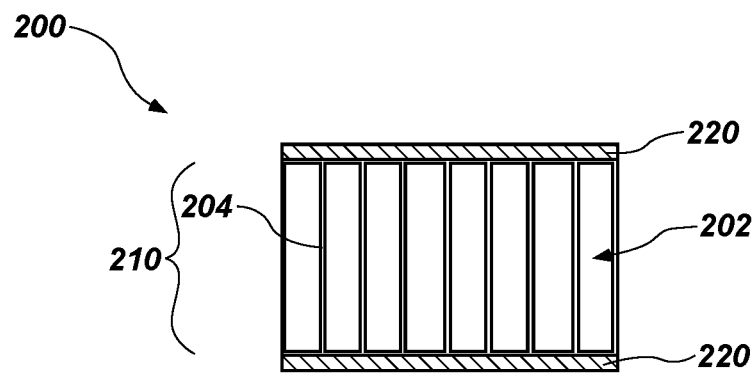
FIG. 2C is a side cross-sectional view of the article of FIG. 2A and FIG. 2B.
Figure 2D:
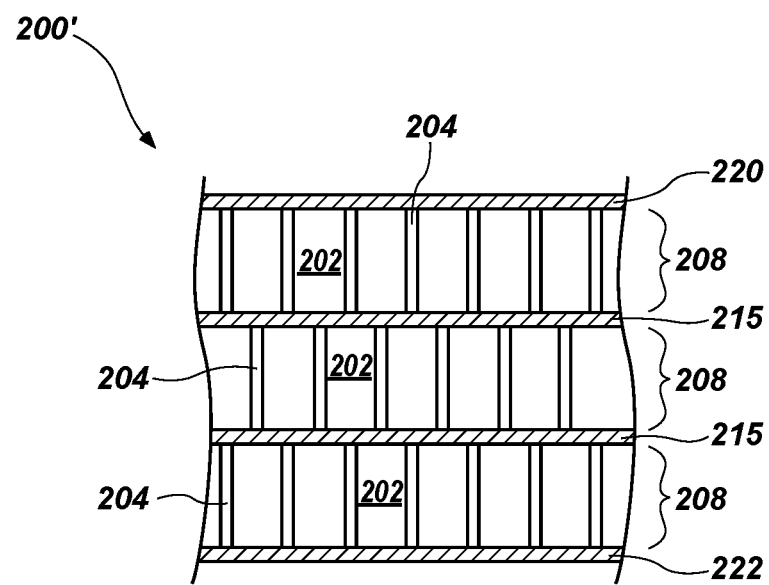
FIG. 2D is a simplified cross-sectional view of an article, in accordance with embodiments of the disclosure.

FIG. 2C is a side cross-sectional view of the article 200. In some embodiments, the core 210 comprises a single layer of cells 202 arranged between the top face sheet 220 and the bottom face sheet 222. Although the article 200 has been described and illustrated as comprising a single layer core, the disclosure is not so limited. FIG. 2D is a simplified side cross-sectional view of an article 200' comprising a plurality of layers 208, each layer 208 including a plurality of cells 202, in accordance with embodiments of the disclosure. An interlayer sheet 215 may be disposed between adjacent layers 208. In some embodiments, the layers 208 may be offset from each other. For example, every other layer 208 may include cells that are aligned with each other, the layer 208 in between the aligned layers 208 having cells 202 that are laterally offset from each other, such as by a distance correspond to half a size of the cells 202. In other embodiments, one or more layers 208 may have cells 202 having a different size (and hence may exhibit a different cell density) than one or more of the other layers 208.

Although FIG. 2D illustrates that the article 200' has 3 layers 208, the disclosure is not so limited. In other embodiments, the article 200' includes 2 layers or more than 3 layers, such as at least about 4 layers, at least about 8 layers, at least about 10 layers, at least about 20 layers, at least about 40 layers, at least about 60 layers, at least about 100 layers, or more than about least about 200 layers.

With continued reference to FIG. 2D, in some embodiments, the cells 202 of at least one of the layers 208 may exhibit a different shape or size than the cells 202 of at least another of the layers 208. In some such embodiments, the cells 202 of at least one of the layers 208 may exhibit a greater cell density than the cells 202 of at least another of the layers 208. By way of nonlimiting example, in some embodiments, the layers 208 proximate the top face sheet 220 and the bottom face sheet 222 may have a greater cell density than the other layers 208. In other embodiments, the layers 208 distal from the top face sheet 220 and the bottom face sheet 222 may have a greater cell density than the other layers 208. In yet other embodiments, the article 200' may include an increasing cell density in a direction from the top face sheet 220 or the bottom face sheet 222 to the other of the top face sheet 220 or the bottom face sheet 222.

Figure 2E:
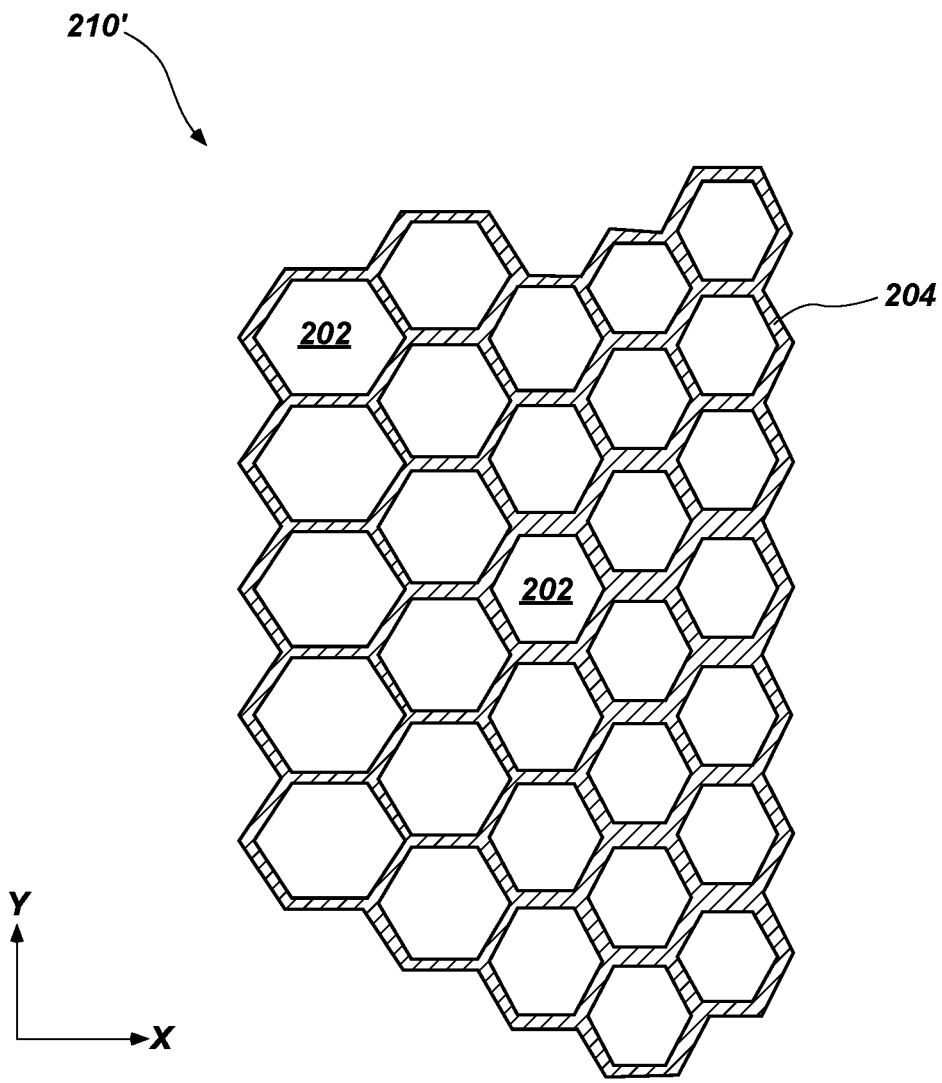
FIG. 2E is a simplified cross-sectional view of a core, in accordance with embodiments of the disclosure.

In some embodiments, the cells 202 may exhibit a varying cell density in at least one direction, such as at least one of the x-direction and the y-direction, within a single layer 208 of the article 200'. In some such embodiments, the cells 202 may exhibit a varying cell density along one or more axes thereof. FIG. 2E is a simplified cross-sectional view of a core 210', in accordance with embodiments of the disclosure. The core 210' includes a plurality of cells 202, as described above with reference to FIG. 2A through FIG. 2D. However, the core 210' may include a varying cell density in one or more directions. As illustrated in FIG. 2E, the size of the cells 202 (and, therefore, the density of the cells 202) may vary from left to right in the view illustrated in FIG. 2E, with cells 202 located to the left having a larger size than the cells 202 located to the right. In other embodiments, the size of the cells 202 may vary from top to bottom.

In some embodiments, the size of the cells 202 may vary in more than one direction, such as in at least the x-direction and in the y-direction, at least the x-direction and the z-direction, or at least the y-direction and the z-direction. In some embodiments, the size of the cells 202 may decrease with a distance from a center of the core 210'. In some such embodiments, the cells 202 proximate external surfaces of the core 210' may have a larger size and a lower cell density than the cells 202 proximate central portions of the core 210'. The core 210' may include a coating, such as the coating 206 described above with reference to FIG. 2B.

Figure 2F:
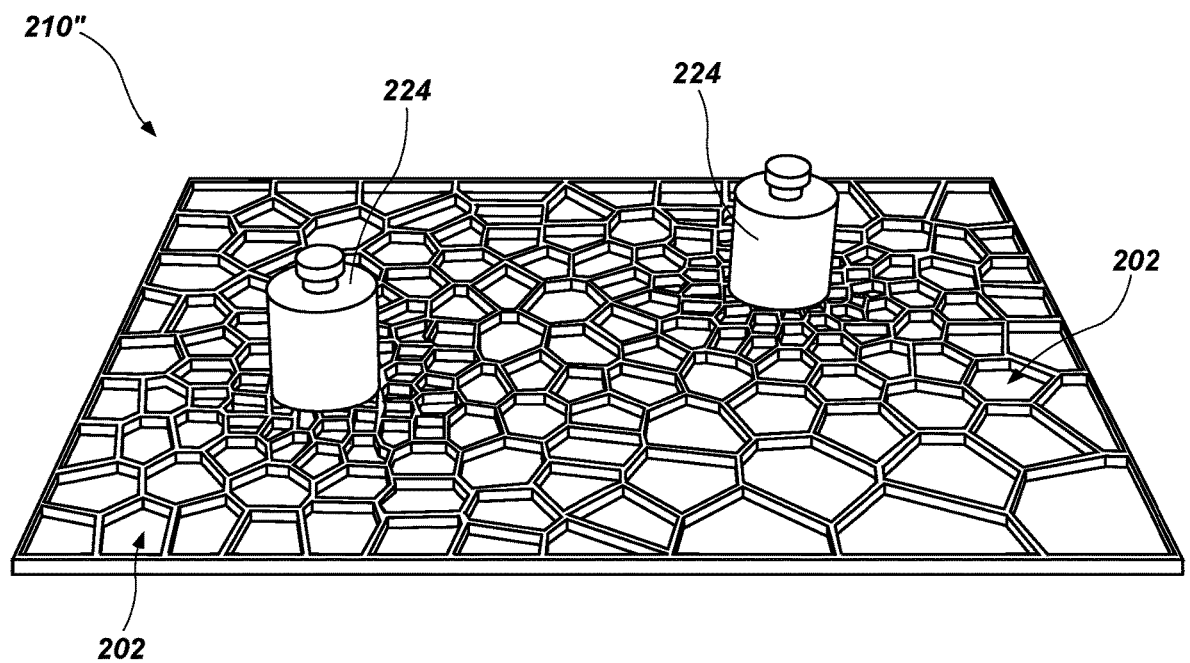
FIG. 2F is a simplified perspective view of a core, in accordance with embodiments of the disclosure.

FIG. 2F is a perspective view of a core 210", in accordance with other embodiments of the disclosure. The core 210" includes a plurality of cells 202 exhibiting varying size and, therefore, the core 210" exhibits a varying cell density along one or more dimensions thereof. One or more channels 224 extend through the core 210". A size of the cells 202 may increase with a radial distance from the channels 224. In other words, a size of the cells 202 may be smaller proximate the channels 224 than at locations more distal from the channel 224. The cells 202 may include a coating, such as the coating 206 described above with reference to FIG. 2B. Accordingly, the core 210" may exhibit a greater cell density proximate the channels 224 than at locations more distal from the channels 224. In some embodiments, the increased cell density proximate the channels 224 may provide electromagnetic shielding or increased radar absorption proximate the channels 224 than at locations more distal from the channels 224. The cells 202 may form a sheath for the materials disposed in the channels 224 (such as a sheath for electrical cables, antennas, etc.).

In some embodiments, the article 200 (FIG. 2A) may include a plurality of layers, such as those described above with reference to FIG. 2D. In some embodiments, at least one of the layers may include cells having a varying cell density and cell size, as described above with reference to FIG. 2E and FIG. 2F.

With reference to FIG. 2A, in some embodiments, the top face sheet 220 and the bottom face sheet 222 may exhibit dielectric properties and may comprise a dielectric skin. In some such embodiments, the top face sheet 220 and the bottom face sheet 222 may comprise, for example, acrylonitrile butadiene styrene and the core 210 may comprise a material exhibiting electrically resistive properties, such as, for example, acrylonitrile butadiene styrene including carbon nanotubes (e.g., one or both of SWCNTs and MWCNTs) dispersed therein.

With reference to FIG. 2A through FIG. 2F, in some embodiments, the article 200 may include at least one varying electrical property in at least a first direction and at least one varying structural property in at least a second direction that is different from the first direction. In some such embodiments, the first direction may be, for example, the x-direction and the second direction may be a direction such as the y-direction, or a direction at an angle between the x-axis and the y-axis (e.g., a direction located about 30° from the x-axis and about 60° from the y-axis). In some embodiments, the article 200 (e.g., the core 210, 210', 210") may exhibit at least one electrical property in at least one direction varying from at least one electrical property (which may be the same at least one electrical property) in a second, different direction and at least one structural property in at least one direction varying from at least one structural property (which may be the same at least one structural property) in a second, different direction. In some embodiments, the direction in which the at least one structural property and the at least one electrical property is the same. In other embodiments, the direction in which the at least one structural property and the at least one electrical property is different. In some embodiments, the varying at least one electrical property and the varying at least one structural property may vary in structural elements defining the core 210, 210', 210". In some such embodiments, the cell walls 204 may exhibit the varying structural and electrical properties in one or more directions.

Figure 3:
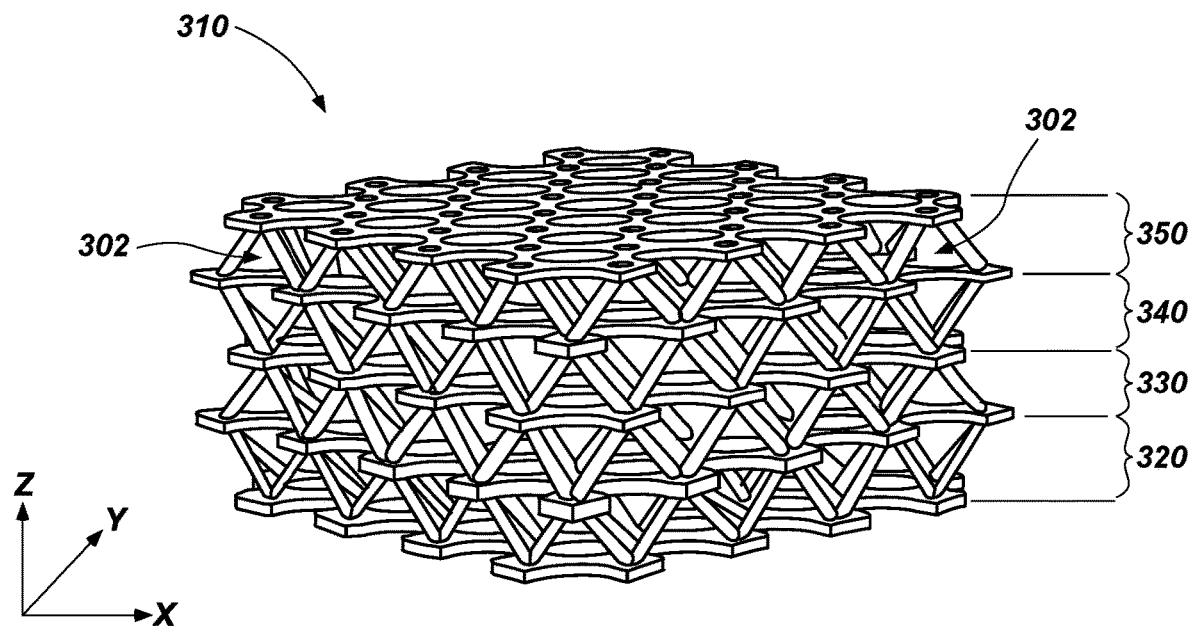
FIG. 3 is a simplified perspective view of a core, in accordance with embodiments of the disclosure.

Although FIG. 2A through FIG. 2F have been described as including a core 210, 210', 210" defined by a plurality of cells 202 having a closed-cell structure the disclosure is not so limited. In other embodiments, the cells 202 may exhibit an open-cell structure. FIG. 3 is a simplified perspective view of a core 310, in accordance with embodiments of the disclosure. The core 310 may comprise a lattice structure having repeating (e.g., reticulated) cells 302 defining the core 310, wherein the cells define an open-cell structure. In some embodiments, the cells 302 may exhibit a pyramidal shape. Although FIG. 3 illustrates a particular lattice structure, the disclosure is not so limited. In other embodiments, the core 310 may comprise a cubic lattice structure, a tetragonal lattice structure, a hexagonal lattice structure, a rhombohedral lattice structure, an orthorhombic lattice structure, a monoclinic lattice structure, a triclinic lattice structure, another lattice structure, or combinations thereof. In other words, the cells 302 may be defined by a cubic shape, a tetragonal shape, a hexagonal shape, a rhombohedral shape, an orthorhombic shape, a monoclinic shape, a triclinic shape, etc.

With continued reference to FIG. 3, the core 310 may include stacked layers of the cells 302. For example, the core 310 may include a first layer 320, a second layer 330 over the first layer 320, a third layer 340 over the second layer 330, and a fourth layer 350 over the third layer 340. In some embodiments, each layer may include a plurality of cells 302 offset from the cells 302 of adjacent layers, such as in the x-direction, the y-direction, or both. In some embodiments, adjacent layers comprise a mirror image of each other. For example, the second layer 330 may comprise a mirror image of the first layer 320 and the third layer 340. In some embodiments, every other layer may be substantially the same (e.g., the first layer 320 may be substantially the same as the third layer 340 and the second layer 330 may be substantially the same as the fourth layer 350). Although FIG. 3 illustrates only four layers, the disclosure is not so limited. In other embodiments, the core 310 may comprise a single layer, two layers, three layers, five layers, six layers, or more layers (e.g., more than about 10 layers, more than about 20 layers, more than about 50 layers, more than about 100 layers, etc.).

The core 310 may exhibit varying properties along one or more directions (e.g., axes) thereof. For example, the core 310 may exhibit varying structural and electrical properties along one or more directions thereof In some embodiments, structural and electrical properties may vary in the same direction. In other embodiments, structural and electrical properties may vary in different directions. In some embodiments, the varying properties may be exhibited by structural elements defining the cells 302, such as the cell walls.

The core 310 may be disposed between, for example, a top face sheet and a bottom face sheet to form a sandwich structure, such as the article 200 described above with reference to FIG. 2A.

Figure 4:
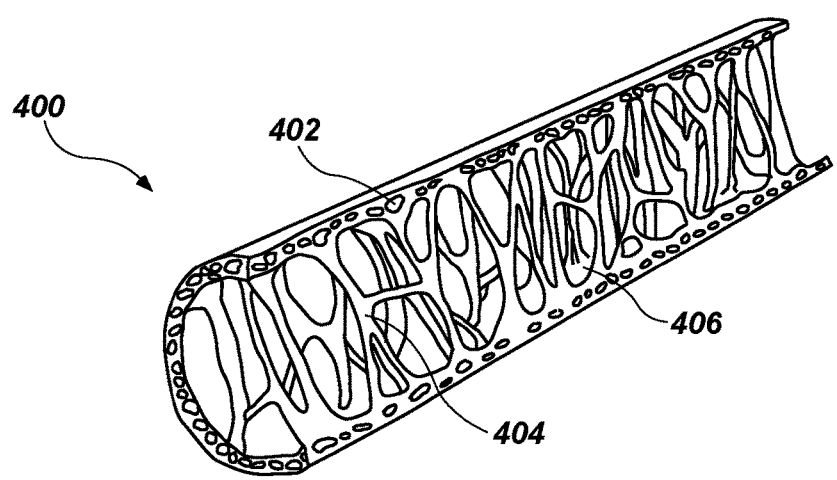
FIG. 4 is a simplified cutaway perspective view of an article, in accordance with embodiments of the disclosure.

In some embodiments, an article exhibiting varying structural properties and electrical properties in one or more directions may simulate structures found in nature. FIG. 4 is a simplified cutaway perspective view of an article 400, in accordance with embodiments of the disclosure. The article 400 may include interconnects 404 extending in random orientations between walls 402 thereof. The interconnects 404 may define openings 406 which may be filled with, for example, air. The interconnects 404 may lend structural integrity to the article 400, while the openings 406 may reduce an overall density and weight of the article 400. In some embodiments, the article 400 may simulate an internal configuration similar to that of a bird bone and may be referred to herein as a so-called "bird bone" structure. In some embodiments, the article 400 may be used to form at least a portion of aircraft, such as aircraft wings.

The article 400 may exhibit varying properties along one or more directions (e.g., axes) thereof, such as along one or more of the walls 402 or the interconnects 404. For example, the article 400 may exhibit varying structural and electrical properties along one or more directions thereof. In some embodiments, structural and electrical properties may vary in the same direction.

Figure 5:
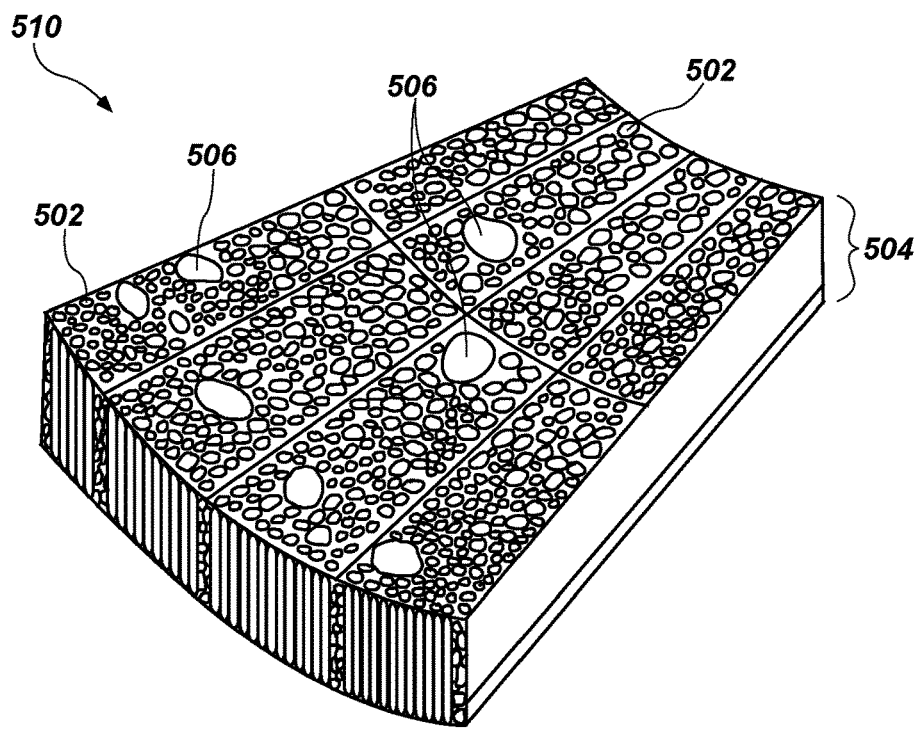
FIG. 5 is a simplified perspective view of a core, in accordance with embodiments of the disclosure.

FIG. 5 is a simplified cutaway plan view of a core 510 in accordance with embodiments of the disclosure. The core 510 may simulate, for example, the microstructure or macro-structure of balsa wood. The core 510 may include a plurality of cells 502, wherein the cells 502 of the plurality of cells 502 exhibit a random orientation and a random size. In other words, the cells 502 may not exhibit a uniform size or a uniform shape.

The core 510 may further include a plurality of channels 506 extending therethrough. The channels 506 may be sized and shaped to receive one or more structures, such as one or more of cables, wiring, conduits, circuit elements, antennas, beams, another component, or combinations thereof. In some embodiments, the channel 506 may comprise a sheath for the one or more structures extending therethrough. In embodiments where the channel 506 receives an antenna, the core 510 may comprise a portion of a radome structure. The core 510 may comprise any of the materials described above with reference to the article 102 (FIG. 1). For example, in some embodiments, the core 510 comprises a thermoplastic material with one or more radar absorbing materials dispersed therein. The radar absorbing materials may comprise carbon nanotubes, carbon fibers, glass fibers, another radar absorbing material, or combinations thereof. In some embodiments, portions of the core 510 proximate the channels 506 may comprise a material formulated and configured to absorb electromagnetic radiation in the radio frequency (e.g., between about 3 kHz and about 300 kHz), while portions of the core 510 distal from the channels 506 may comprise another material. By way of nonlimiting example, the channels 506 may include a coating of a radar absorbing material on inner surfaces thereof, while other portions of the core 510 do not include the coating.

Although FIG. 5 illustrates only one layer 504, the core 510 may include a plurality of layers 504. In some embodiments, adjacent layers 504 may be aligned with respect to each other such that the channels 506 are aligned with each other and form a continuous channel throughout the core 510. In some embodiments, a top face sheet and a bottom face sheet may be disposed over the core 510 to form a sandwich structure, as described above with reference to FIG. 2A.

Figure 6:
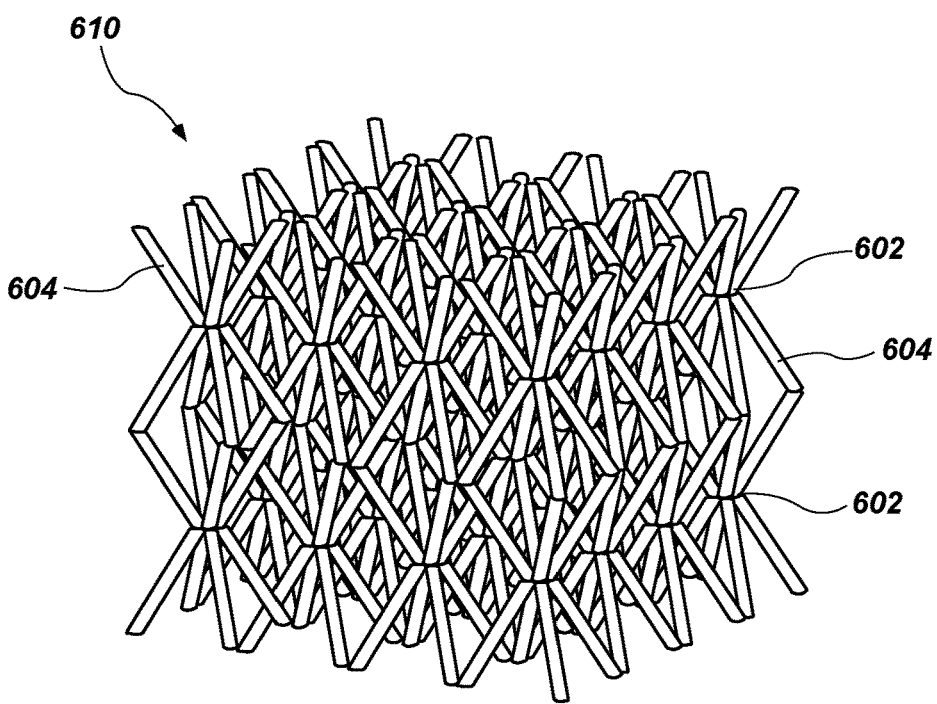
FIG. 6 is a simplified perspective view of a core, in accordance with embodiments of the disclosure.

Referring to FIG. 6, a core 610 comprising an intertwined lattice is illustrated. The core 610 may include a cross-lattice structure exhibiting desired structural properties and electrical properties. The core 610 may include a plurality of cells 602 each interconnected to a plurality of other cells 602 with interconnect structures 604. The cells 602 may form a structure having an open-cell structure. In some embodiments, each cell 602 may be surrounded by at least four cells 602 with the interconnect structures 604. Spaces between the cells 602 and the interconnect structures 604 may be open and may reduce a density of the core 610.

In some embodiments, different layers of the core 610 may exhibit different structural and electrical properties. In some embodiments, a top face sheet and a bottom face sheet may be disposed over the core 610 to form a sandwich structure, as described above with reference to FIG. 2A.

Structural and electrical properties of the core 610 may vary in one or more directions. For example, varying size of the cells 602 in one or more directions may vary structural and electrical properties of the core 610. In some embodiments, varying the composition of the interconnect structures 604 in one or more directions may vary the structural and electrical properties of the core 610. In some such embodiments, the varying electrical and structural properties of the core 610 may be reflected by varying structural and electrical properties of the interconnect structures 604.

Figure 7:
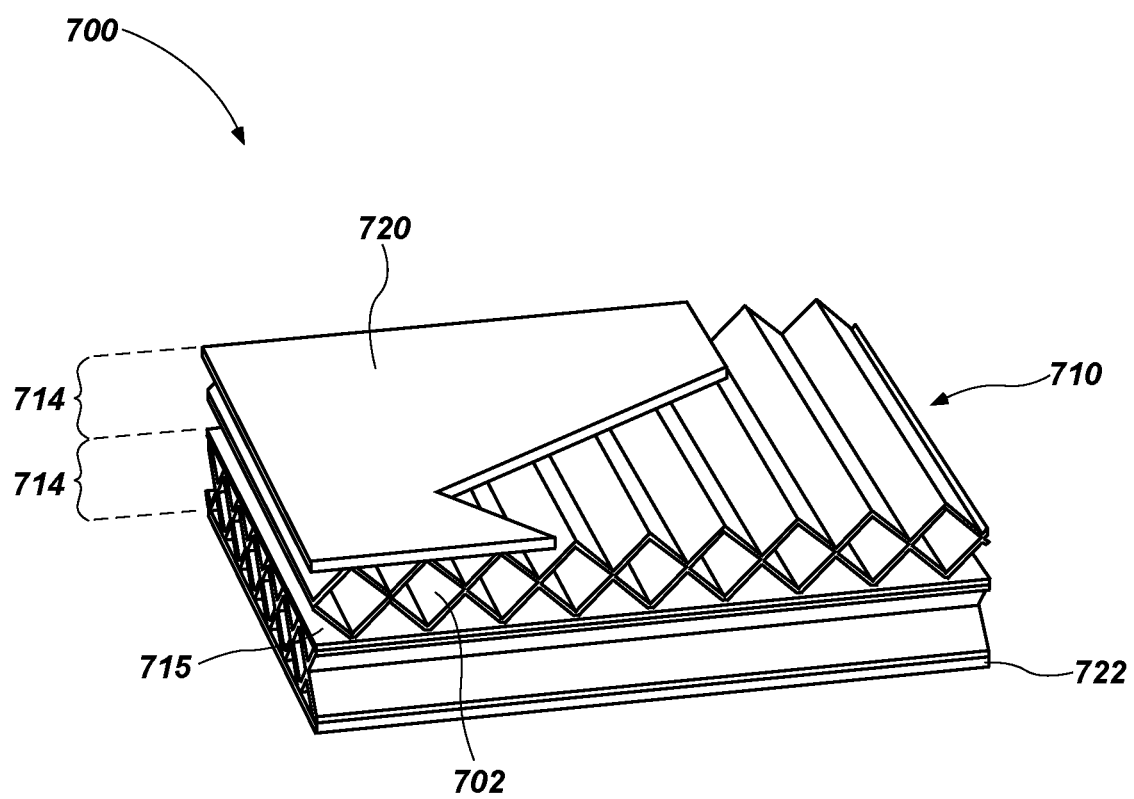
FIG. 7 is a simplified partial cutaway perspective view of an article, in accordance with embodiments of the disclosure.

FIG. 7 is a simplified partial cutaway perspective view of an article 700, in accordance with embodiments of the disclosure. The article 700 may be configured as a lattice truss core sandwich structure. The article 700 may include a core 710 comprising a plurality of layers 714 of a composite material disposed between a top face sheet 720 and a bottom face sheet 722. An interlayer face sheet 715 may be disposed between adjacent layers 714.

Each layer 714 may include a plurality of cells 702. In FIG. 7, the cells 702 are illustrated as exhibiting a diamond shape. In other embodiments, the cells 702 may define other shapes, such as triangular, rectangular, square, diamond, circular, oval, pentagonal, octagonal, etc.

In some embodiments, adjacent layers 714 may be oriented at an angle relative to each other. For example, with reference to FIG. 7, adjacent layers 714 may be oriented substantially perpendicular to each other. In other embodiments, adjacent layers 714 may be oriented at an angle other than substantially perpendicular to each other, such as about 15°, about 30°, about 45°, about 60°, about 75°, for example.

Although FIG. 7 illustrates two layers 714, the disclosure is not so limited. In other embodiments, the article 700 may include 3 layers, 4 layers, at least about 10 layers, at least about 20 layers, at least about 50 layers, at least about 100 layers, or at least about 200 layers.

The articles 102, 200, 200', 400, 700 and the cores 210, 210', 310, 510, 610, 710 described above may be formed with one or more channels or cavities configured to receive one or more embedded structures. For example, the articles or cores may be sized, shaped, and configured to receive one or more of cables, wiring, conduits, circuit elements, antennas, beams, another component, or combinations thereof.

Any of the articles 102, 200, 200', 400, 700 and any of the cores 210, 210', 210'', 310, 510, 610, 710 described above may be formed to exhibit desired structural and electrical properties throughout the composition thereof. Since the articles and cores may be formed by additive manufacturing with different materials (e.g., matrix materials, additive materials, concentrations of additive materials) along one or more directions of the articles and cores, the articles and cores may be formed to exhibit varying electrical and structural properties along one or more directions thereof. For example, one or more of electromagnetic radiation absorption of one or more wavelengths, electromagnetic radiation reflection of one or more wavelengths, electromagnetic shielding (e.g., radiofrequency shielding), dielectric properties, electrical conductivity, density, cell density, cell size, shear strength, compressive strength, tensile strength, another property, or combinations thereof may be varied along one or more directions of the articles and cores described above.

In some embodiments, the articles 102, 200, 200', 400, 700 and the cores 210, 210', 210", 310, 510, 610, 710 described above may exhibit a density between about 10 kg/m$^3$ and about 1,000 kg/m$^3$, such as between about 10 kg/m$^3$ and about 20 kg/m$^3$, between about 20 kg/m$^3$ and about 50 kg/m$^3$, between about 50 kg/m$^3$ and about 100 kg/m$^3$, between about 100 kg/m$^3$ and about 200 kg/m$^3$, between about 200 kg/m$^3$ and about 400 kg/m$^3$, between about 400 kg/m$^3$ and about 600 kg/m$^3$, or between about 600 kg/m$^3$ and about 1,000 kg/m$^3$. In some embodiments, the density may vary in one or more directions, based on, for example, varying cell density or varying additive composition and concentration. In some embodiments, the articles or core structures may be denser at central locations than proximate external portions thereof. In some such embodiments, the core structures may have an increasing density proximate the top face sheet and the bottom face sheet than proximate a vertical center of the article. In other embodiments, the core structures may exhibit a lower density proximate the top face sheet and the bottom face sheet than proximate a vertical center of the article. In other embodiments, the core structures may exhibit a greater density proximate a periphery of the core structure than proximate a laterally central portion of the structure. In other embodiments, the core structure may exhibit a lower density proximate a periphery thereof than proximate a laterally central portion of the structure.

In some embodiments, the articles 102, 200, 200', 400, 700 and the cores 210, 210', 210", 310, 510, 610, 710 described above may exhibit a void fraction (also referred to as porosity) (i.e., a measure of the void (empty) space in a material represented as a fraction of the volume of voids relative to the total volume of the material) between about 0.10 and about 0.95, such as between about 0.10 and about 0.20, between about 0.20 and about 0.30, between about 0.30 and about 0.50, between about 0.50 and about 0.60, between about 0.60 and about 0.70, between about 0.70 and about 0.80, between about 0.80 and about 0.90, or between about 0.90 and about 0.95. In some embodiments, the void fraction may vary in one or more directions.

In some embodiments, at least a portion of the articles 102, 200, 200', 400, 700 and the cores 210, 210', 210", 310, 510, 610, 710 described above may exhibit an electrical conductivity between about $10^{-20}$ Siemens/m (S/m) and about $10^8$ S/m, such as between about $10^{-20}$ S/m and about $10^{-16}$ S/m, between about $10^{-16}$ S/m and about $10^{-12}$ S/m, between about $10^{-12}$ S/m and about $10^{-8}$ S/m, between about $10^{-8}$ S/m and about $10^4$ S/m, between about $10^4$ S/m and about 0 S/m, between about 0 S/m and about 100 S/m, between about 100 S/m and about 1,000 S/m, between about 1,000 S/m and about $10^5$ S/m, between about $10^5$ S/m and about $10^8$ S/m. In some embodiments, the top face sheet 220 and the bottom face sheet 222 may be electrically resistive and the core structure may be electrically conductive. In other embodiments, the top face sheet 220 and the bottom face sheet 222 may be electrically conductive and the core structure may be electrically resistive. In some embodiments, the articles or core structures may be more electrically conductive at central locations than proximate external portions thereof In some such embodiments, the core structures may have an increasing electrical conductivity proximate the top face sheet and the bottom face sheet than proximate a vertical center of the article. In other embodiments, the core structures may exhibit a lower electrical conductivity proximate the top face sheet and the bottom face sheet than proximate a vertical center of the article. In other embodiments, the core structures may exhibit a greater electrical conductivity proximate a periphery of the core structure than proximate a laterally central portion of the structure. In other embodiments, the core structure may exhibit a lower electrical conductivity proximate a periphery thereof than proximate a laterally central portion of the structure.

At least a portion of the articles 102, 200, 200', 400, 700 and the cores 210, 210', 310, 510, 610, 710 described above may exhibit electromagnetic absorption properties with respect to one or more wavelengths of electromagnetic radiation. For example, one or more portions thereof may be formulated and configured to absorb electromagnetic radiation in the radio wavelength of the electromagnetic spectrum (e.g., wavelengths between for example, about 1.0 mm and about 100 km). In some such embodiments, the portions of the articles 102, 200, 200', 400, 700 and the cores 210, 210', 210", 310, 510, 610, 710 described above exhibiting the radio absorption properties may be referred to herein as comprising a radiation-absorbent material (RAM). By way of nonlimiting example, in some embodiments, the radiation-absorbent material may comprise a matrix material and a mixture of additive selected from the group consisting of iron, nickel, cobalt, carbon (e.g., carbon nanotubes, carbon fibers, carbon black, graphite, etc.), and combinations thereof dispersed in the matrix material. In some such embodiments, the additive may include be loaded solely at up to about 80.0 weight percent or about 10.0 parts iron, nickel, and/or cobalt per every about 1.0 part carbon, such as between about 0.1 part and about 0.2 part, between about 0.2 part and about 0.5 part, between about 0.5 part and about 1.0 part, between about 1.0 part and about 2.0 parts, between about 2.0 parts and about 5.0 parts, or between about 5.0 parts and about 10.0 parts iron, nickel, and/or cobalt per every about 1.0 part carbon. In some embodiments, the articles or core structures may be exhibit greater electromagnetic absorption properties at central locations than proximate external portions thereof In some such embodiments, the core structures may have an increasing capacity to absorb electromagnetic radiation proximate the top face sheet and the bottom face sheet than proximate a vertical center of the article. In other embodiments, the core structures may exhibit a lower capacity to absorb electromagnetic radiation proximate the top face sheet and the bottom face sheet than proximate a vertical center of the article. In other embodiments, the core structures may exhibit a greater capacity to absorb electromagnetic radiation proximate a periphery of the core structure than proximate a laterally central portion of the structure. In other embodiments, the core structure may exhibit a lower capacity to absorb electromagnetic radiation proximate a periphery thereof than proximate a laterally central portion of the structure.

In other embodiments, at least a portion of the articles 102, 200, 200', 400, 700 and the cores 210, 210', 210", 310, 510, 610, 710 described above may be formulated and configured to absorb radio waves and at least another portion of the articles 102, 200, 200', 400, 700 and the cores 210, 210', 210", 310, 510, 610, 710 described above may be formulated and configured to absorb electromagnetic waves having a different wavelength.

In some embodiments, at least a portion of the articles 102, 200, 200', 400, 700 and the cores 210, 210', 210", 310,

510, 610, 710 described above may be formulated and configured to exhibit electromagnetic shielding properties. In some such embodiments, at least a portion thereof may comprise an electrically conductive material, a magnetic material, or a combination thereof. By way of nonlimiting example, at least a portion of the articles 102, 200, 200', 400, 700 and the cores 210, 210', 210", 310, 510, 610, 710 described above may comprise a magnetic material, such as one or more of iron, nickel, cobalt, another magnetic material, or combinations thereof.

In some embodiments, at least a portion of the articles 102, 200, 200', 400, 700 and the cores 210, 210', 210", 310, 510, 610, 710 described above may be formed with an additive material comprising fibers. In some such embodiments, the fibers may be aligned. For example, in some embodiments, the fibers may be aligned and oriented along one axis of the articles or core structures. In some such embodiments, the article or core structure may exhibit anisotropic properties, such as anisotropic electric properties (e.g., absorption of incident electromagnetic radiation in one direction, but not from other directions). In other embodiments, the article or core structure may include randomly oriented fibers.

The articles 102, 200, 200', 400, 700 and the cores 210, 210', 210", 310, 510, 610, 710 described above may be formulated and configured to exhibit so-called aerospace grade properties. For example, the articles 102, 200, 200', 400, 700 and the cores 210, 210', 210", 310, 510, 610, 710 described above may exhibit a shear strength between about 100 psi (about 689.5 kPa) and about 500 psi (about 3,447 kPa), such as between about 100 psi (about 689.5 kPa) and about 200 psi (about 1,379 kPa), between about 200 psi (about 1379 kPa) and about 300 psi (about 2,068 kPa), between 300 psi (about 2068 kPa) and about 400 psi (about 2,758 kPa), or between about 400 psi (about 2758 kPa) and about 500 psi (about 3,447 kPa).

The tensile strength of the articles 102, 200, 200', 400, 700 and the cores 210, 210', 210", 310, 510, 610, 710 described above may be between about 10 ksi (wherein 1 ksi=1,000 psi) and about 500 ksi, such as between about 10 ksi and about 100 ksi, between about 100 ksi and about 200 ksi, between about 200 ksi and about 300 ksi, between about 300 ksi and about 400 ksi, or between about 400 ksi and about 500 ksi.

The compressive strength of the articles 102, 200, 200', 400, 700 and the cores 210, 210', 210", 310, 510, 610, 710 described above may be between about 100 psi (about 689.5 kPa) and about 500 psi (about 3,447 kPa), such as between about 100 psi (about 689.5 kPa) and about 200 psi (about 1,379 kPa), between about 200 psi (about 1379 kPa) and about 300 psi (about 2,068 kPa), between 300 psi (about 2068 kPa) and about 400 psi (about 2,758 kPa), or between about 400 psi (about 2758 kPa) and about 500 psi (about 3,447 kPa).

Although the cells 202 have been described as being hollow, the disclosure is not so limited. In some embodiments, the cells 202 may be filled with a metal foam, such as, for example, open-celled metal foam, closed-cell metal foam, or a combination thereof. The metal foam may comprise, for example, nickel, osmium, iron, aluminum, another metal, or combinations thereof.

Figure 8:
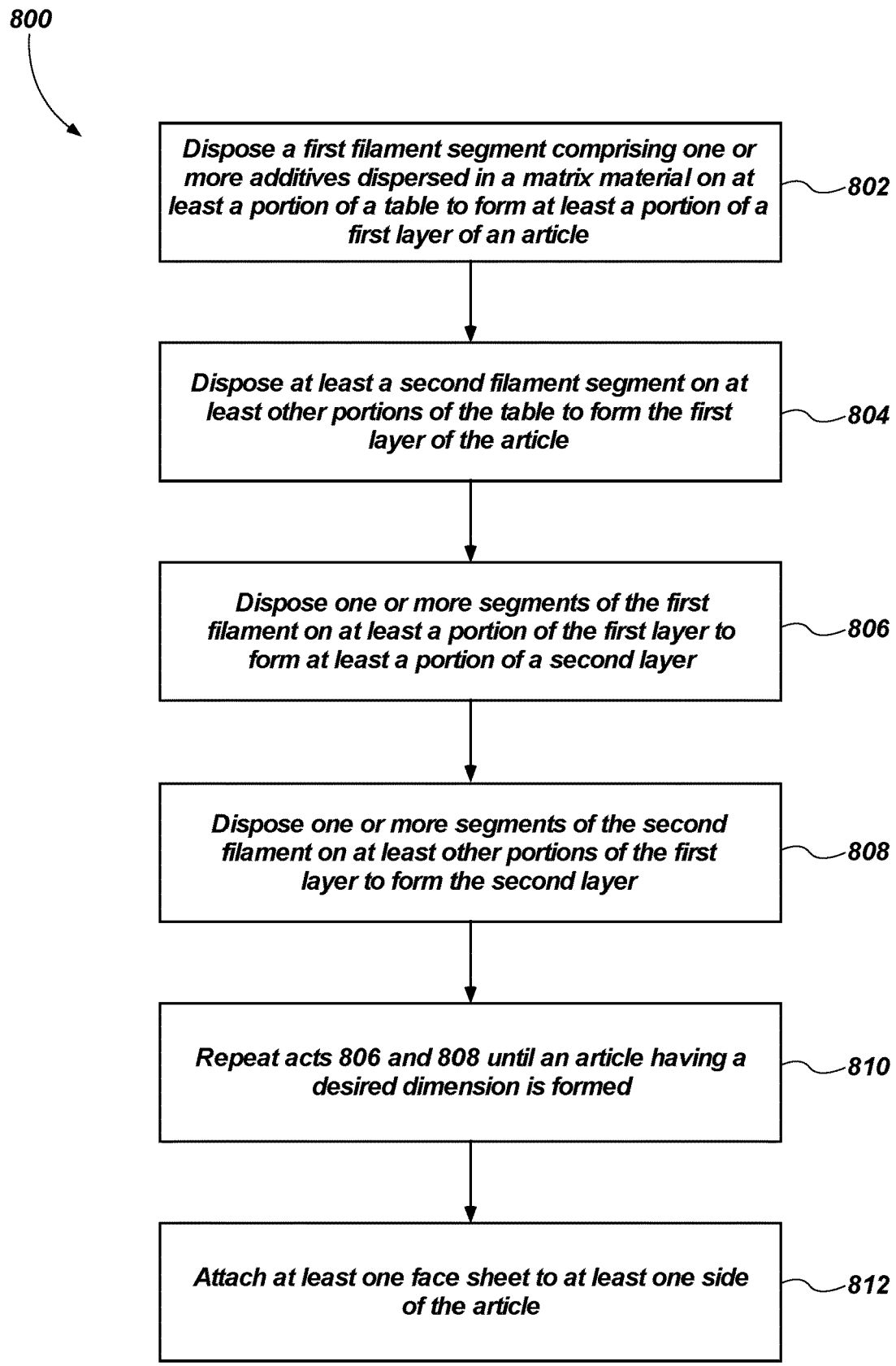
FIG. 8 is a simplified flow diagram illustrating a method of forming one or more articles, in accordance with embodiments of the disclosure.

FIG. 8 is a simplified flow diagram illustrating a method 800 of forming one or more articles, in accordance with embodiments of the disclosure. The method 800 includes act 802 including disposing a first filament segment comprising one or more additives dispersed in a matrix material on at least a portion of a table to form at least a portion of a first layer of an article; act 804 including disposing at least a second filament segment on at least other portions of the table to form the first layer of the article; act 806 including disposing one or more segments of the first filament on at least a portion of the first layer to form at least a portion of a second layer; act 808 including disposing one or more segments of the second filament on at least other portions of the first layer to form the second layer; act 810 including repeating acts 806 and 808 until a structure having a desired dimension is formed; and act 812 including attaching at least one face sheet to at least one side of the article.

Act 802 includes disposing a first filament segment comprising one or more additives dispersed in a matrix material on at least a portion of a table to form at least a portion of a first layer of an article. The matrix material and the one or more additives may be substantially the same as those described above with reference to FIG. 1 through FIG. 2B. The first filament segment may be disposed on the table through a first deposition head and may be disposed at desired locations of the table to form portions of the first layer exhibiting structural and electrical properties of the first filament segment at the locations where the first filament segment is deposited.

Act 804 includes disposing at least a second filament segment on at least other portions of the table to form the first layer of the article. The second filament may be disposed on portions of the table on which the first filament segment was not disposed in act 802. In some embodiments, the second filament segment comprises the same matrix material as the first filament segment and comprises a different additive than the first filament segment. In other embodiments, the second filament segment comprises the same matrix material and additives as the first filament segment, but comprises a different concentration of the additive in the matrix material. In yet other embodiments, the second filament segment comprises a different matrix material than the first filament segment and may comprise the same additives or different additives at the same or different concentrations dispersed through the matrix material. In some embodiments, the second filament segment may exhibit different electrical properties than the first filament segment. By way of nonlimiting example, the first filament segment may comprise a radar absorbing material while the second filament segment may not comprise a radar absorbing material. In some embodiments, the second filament segment may be disposed on the table through a second deposition head that is different from the first deposition head. In other embodiments, the second filament segment may be disposed on the table through the first deposition head, wherein the first deposition head is configured to mix one or more additives in the filament in situ to vary the structural and electrical properties of the filament.

In some embodiments, act 804 includes disposing at least a third filament segment on the table on portions of the table on which the first filament segment and the second filament segment were not disposed. The third filament segment may be disposed on the table through, for example, a third deposition head different from the first deposition head and the second deposition head. In other embodiments, the third filament segment may be disposed on the table through the first deposition head, wherein the first deposition head is configured to mix one or more additives with the filament in situ. The third filament segment may comprise a different matrix material, a different concentration of the additives, a different composition of additives, or combinations thereof relative to the first filament segment and the second filament segment. The third filament segment may exhibit different structural and electrical properties than the first filament segment and the second filament segment. In some embodiments, any number of filaments or filament segments may be disposed on the table to form the first layer exhibiting a desired composition and properties at desired locations thereof. After forming the first layer, a table on which the article to be formed is disposed may be moved in a vertical direction relative to one or more deposition heads of the tool.

Act 806 includes disposing a first filament segment on at least a portion of the first layer to form at least a portion of a second layer. In some embodiments, the deposition heads (e.g., the first deposition head, the second deposition, the third deposition head, etc.) may be moved in a vertical direction relative to the first layer. After moving the deposition heads, one or more segments of the first filament may be disposed on at least a portion of the first layer to form a desired pattern of the first filament segment on the first layer. In some embodiments, a pattern of the first filament segments on the first layer may be different than a pattern of the first filament segments of the first layer. In other words, in some such embodiments, at least a segment of the first filament of the second layer may be disposed on portions of the first layer on which the first filament segments were not disposed.

Act 808 includes disposing one or more segments of the second filament on at least other portions of the first layer to form the second layer. For example, segments of the second filament may be disposed on the first layer at desired portions thereof to form the second layer. In some embodiments, a pattern of the second filament segments on the first layer may be different than a pattern of the second filament segments of the first layer. In other words, in some such embodiments, at least a portion of the second filament segments of the second layer may be disposed on portions of the first layer on which the second filament segments were not disposed.

In some embodiments, act 808 includes disposing segments of at least a third filament on the first layer on portions of the first layer on which segments of the first filament and the second filament were not disposed. The third filament segments may be disposed on the first layer through, for example, a third deposition head different from the first deposition head and the second deposition head, as described above with reference to act 804. After forming the second layer, a table on which the article to be formed is disposed may be moved in a vertical direction relative to one or more deposition heads of the tool.

Act 810 includes repeating acts 806 and 808 until an article having a desired dimension (e.g., thickness) is formed. In some embodiments, act 806 and act 808 are repeated until the article comprises at least about 10 layers, at least about 20 layers, at least about 50 layers, at least about 100 layers, or at least about 200 layers. However, the disclosure is not so limited and the article may be formed to comprise a lesser number of layers or a greater number of layers than that described.

Act 812 includes attaching at least one face sheet to at least one side of the article. The face sheet may comprise the same materials as the top face sheet 220 or the bottom face sheet 222 described above with reference to FIG. 2A. The at least one face sheet may be attached to the article, such as by soldering or curing. In other embodiments, the at least one face sheet may be attached to the article by curing, such as with an epoxy material. In other embodiments, the article may be formed as described above on a face sheet carried on the table, and may be affixed thereto by adhesive properties of materials forming structures on the face sheet.

Forming the articles and core structures by additive manufacturing may facilitate forming articles and structures exhibiting varying electrical and structural properties in one or more directions. The methods described herein may facilitate voxel by voxel control of both electrical and structural properties of articles and cell cores formed by the methods described herein. In some embodiments, the structural components of the articles and cell cores (e.g., cell walls) may exhibit the varying electrical and structure properties in at least one direction. In some embodiments, structural components of the cell cores exhibit varying structural and electrical properties in at least one direction and the top face sheet and bottom face sheet may not exhibit varying structural and electrical properties in at least one direction.

Although the articles and structures have been described as being formed by fused filament fabrication, the disclosure is not so limited. In other embodiments, the articles and structures may be fabricated by one or more of stereolithography (SLA), ink jet printing, binder jet printing (also referred to as "binder jetting"), selective laser sintering (SLS), or another suitable additive manufacturing process.

Figure 9:
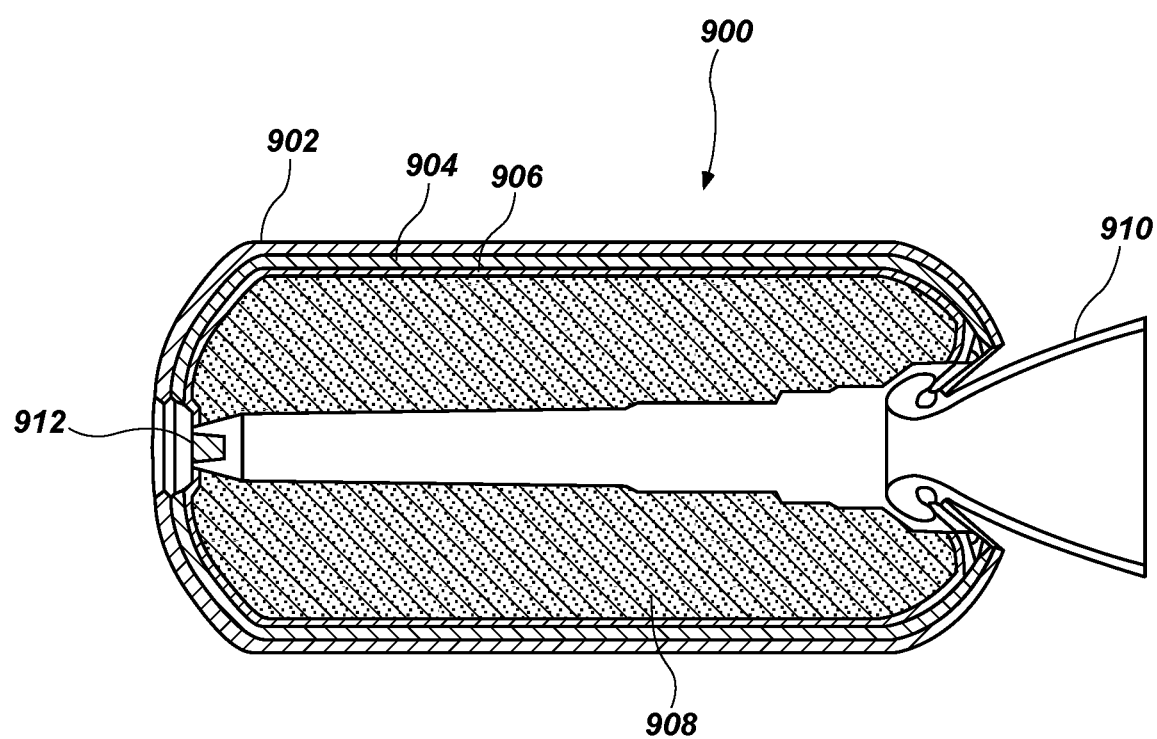
FIG. 9 is a simplified cross-sectional view of a rocket motor, in accordance with embodiments of the disclosure.

FIG. 9 is a simplified cross-sectional view of a rocket motor 900 including one or more articles or core structures (such as one or more of the articles 102, 200, 200', 400, 700 and any of the cores 210, 210', 210", 310, 510, 610, 710), according to embodiments of the disclosure. The rocket motor 900 may, for example, be configured to be a component (e.g., a stage) of a larger assembly (e.g., a multi-stage rocket motor assembly). The rocket motor 900 may include an assembly comprising a casing 902, an insulation material 904, a liner 906, and a propellant structure 908 (e.g., a solid propellant such as a double-base propellant, an HTPB-based propellant, etc.). During operation, the insulation material 904 may protect the rocket motor casing 902 from thermal and erosive effects of particle streams generated from combustion of the propellant structure 908. The insulation material 904 may further be disposed on surfaces of a nozzle assembly 910 to protect the nozzle assembly 910 from hot exhaust gases. The liner 906 bonds the insulation material 904 to the propellant structure 908. The rocket motor 900 may further include an igniter 912 that may be activated to ignite the propellant structure 908.

The casing 902 may include a metal, a composite material, or a combination of metal and composite materials. In some embodiments, the casing 902 includes one or more of the articles or core structures described above with reference to FIG. 2A through FIG. 7.

The propellant structure 908 may be formed of and include at least one propellant material, such as at least one solid propellant. Various examples of suitable solid propellants and components thereof are described in Thakre et al., Solid Propellants, Rocket Propulsion, Vol. 2, Encyclopedia of Aerospace Engineering, John Wiley & Sons, Ltd. 2010, the disclosure of which document is hereby incorporated herein in its entirety by this reference. The solid propellant may be a class 4.1, 1.4, or 1.3 material, as defined by the United States Department of Transportation shipping classification, so that transportation restrictions are minimized. By way of non-limiting example, the propellant of the propellant structure 908 may be formed of and include a polymer having one or more of a fuel and an oxidizer incorporated therein. The polymer may be an energetic polymer or a non-energetic polymer, such as glycidyl nitrate (GLYN), nitratomethylmethyloxetane (NMMO), glycidyl azide (GAP), diethyleneglycol triethyleneglycol nitraminodiacetic acid terpolymer (9DT-NIDA), bis(azidomethyl)- oxetane (BAMO), azidomethylmethyl-oxetane (AMMO), nitraminomethyl methyloxetane (NAMMO), bis(difluoroaminomethyl)oxetane (BFMO), difluoroaminomethylmethyloxetane (DFMO), copolymers thereof, cellulose acetate, cellulose acetate butyrate (CAB), nitrocellulose, polyamide (nylon), polyester, polyethylene, polypropylene, polystyrene, polycarbonate, a polyacrylate, a wax, a hydroxyl-terminated polybutadiene (HTPB), a hydroxyl-terminated poly-ether (HTPE), carboxyl-terminated polybutadiene (CTPB) and carboxyl-terminated polyether (CTPE), diaminoazoxy furazan (DAAF), 2,6-bis(picrylamino)-3,5-dinitropyridine (PYX), a polybutadiene acrylonitrile/acrylic acid copolymer binder (PBAN), polyvinyl chloride (PVC), ethylmethacrylate, acrylonitrile-butadiene-styrene (ABS), a fluoropolymer, polyvinyl alcohol (PVA), or combinations thereof. The polymer may function as a binder, within which the one or more of the fuel and oxidizer is dispersed. The fuel may be a metal, such as aluminum, nickel, magnesium, silicon, boron, beryllium, zirconium, hafnium, zinc, tungsten, molybdenum, copper, or titanium, or alloys mixtures or compounds thereof, such as aluminum hydride ($AlH_3$), magnesium hydride ($MgH_2$), or borane compounds ($BH_3$). The metal may be used in powder form. The oxidizer may be an inorganic perchlorate, such as ammonium perchlorate or potassium perchlorate, or an inorganic nitrate, such as ammonium nitrate or potassium nitrate. Other oxidizers may also be used, such as hydroxylammonium nitrate (HAN), ammonium dinitramide (ADN), hydrazinium nitroformate, a nitramine, such as cyclotetramethylene tetranitramine (HMX), cyclotrimethylene trinitramine (RDX), 2,4,6,8,10, 12-hexanitro-2,4,6,8,10,12-hexaazaisowurtzitane (CL-20 or HNIW), and/or 4,10-dinitro-2,6,8,12-tetraoxa-4,10-diazatetracyclo-[$5.5.0.0^{5.9}.0^{3.11}$]-dodecane (TEX). In addition, the propellant of the propellant structure layers 504 may include additional components, such as one or more of a plasticizer, a bonding agent, a combustion rate modifier, a ballistic modifier, a cure catalyst, an antioxidant, and a pot life extender, depending on the desired properties of the propellant. These additional components are well known in the rocket motor art and, therefore, are not described in detail herein. The components of the propellant of the propellant structure 908 may be combined by conventional techniques, which are not described in detail herein.

With continued reference to FIG. 9, the nozzle assembly 910 may be cooperatively associated with the casing 902 and the propellant structure 908 so as to produce a desired thrust. The nozzle assembly 910 may be stationary (e.g., fixed), or may be adjustable to selectively alter the course of flight of the rocket motor 900 (and, hence, of a launch vehicle including the rocket motor 900). In some embodiments, the nozzle assembly 910 includes a thrust nozzle, a flexible bearing assembly connected to the thrust nozzle and the casing 902, and at least one actuator connected to the thrust nozzle. Lateral movement of the flexible bearing assembly by way of the actuator may be used to modify the position of the thrust nozzle so as to control the direction of the rocket motor 900 (and, hence, of a launch vehicle including the rocket motor 900) during use and operation (e.g., flight) thereof. Suitable configurations (e.g., components, component shapes, component sizes, component materials, component arrangements, etc.) for the nozzle assembly 910 are well known in the rocket motor art and, therefore, are not described in detail herein.

Figure 10:
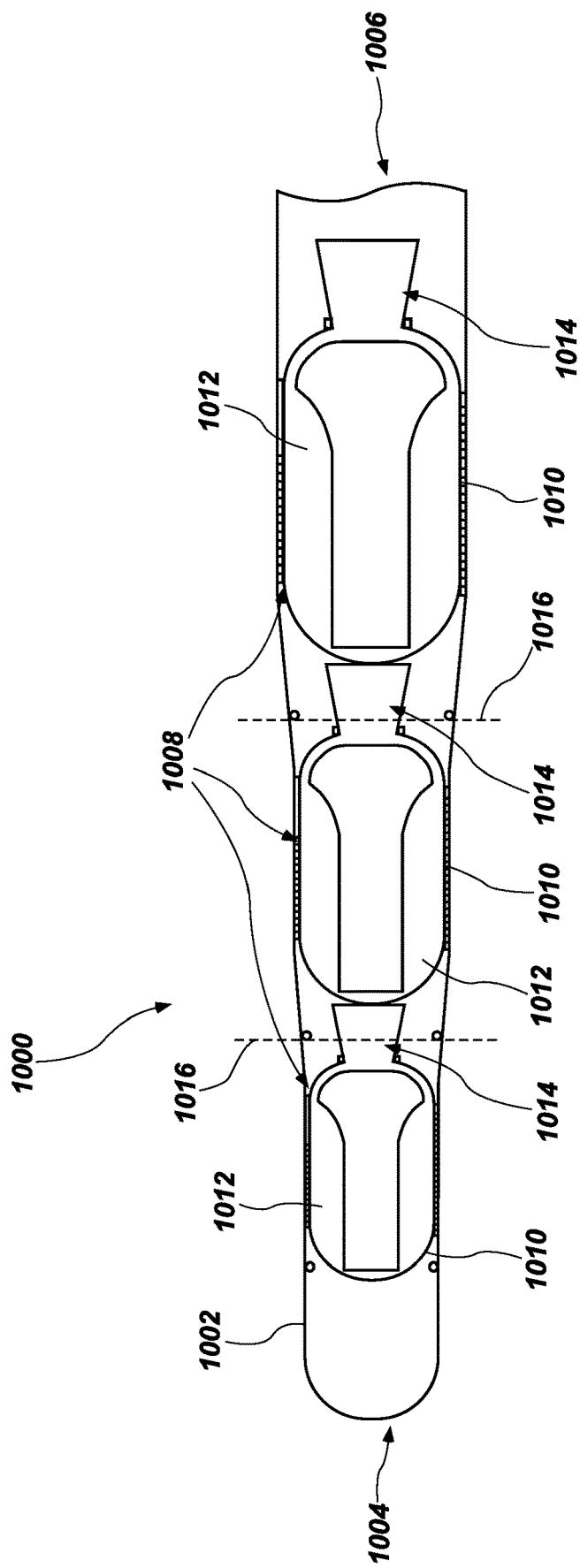
FIG. 10 is a cross-sectional view of a multi-stage rocket motor assembly, in accordance with embodiments of the disclosure.

FIG. 10 is a cross-sectional view of a multi-stage rocket motor assembly 1000, in accordance with an embodiment of the disclosure. The multi-stage rocket motor assembly 1000 may include an outer housing 1002 having a closed forward end 1004 and an open aft end 1006. The outer housing 1002 may formed of and include one or more articles or core structures described above with reference to FIG. 2A through FIG. 7. For example, the outer housing 1002 may be formed of and include at least one sandwich structure, such as the article 200 (FIG. 2A).

The multi-stage rocket motor assembly 1000 may also include plurality of stages 1008 provided in an end-to-end relationship with one another within the outer housing 1002. For example, as shown in FIG. 10, the multi-stage rocket motor assembly 1000 may include three (3) stages 1008 each contained within the outer housing 1002. In additional embodiments, the multi-stage rocket motor assembly 1000 may include a different number of stages 1008, such as from one (1) stage to ten (10) stages. The stages 1008 may include casings 1010, propellant structures 1012 with the casings 1010, and nozzle assemblies 1014 physically connected to aft ends of the casings 1010. One or more of the stages 1008 may be substantially similar to the rocket motor 900 previously described with reference to FIG. 9. The outer housing 1002 may be configured to be severable at locations 1016, as indicated by dashed lines, associated with the stages 1008 during use and operation of the multi-stage rocket motor assembly 1000 (e.g., following combustion of the propellant structure 1012 within a given one of the stages 1008).

The articles and structures (e.g., the articles 102, 200, 200', 400, 700 and the cores 210, 210', 310, 510, 610, 710) described herein may exhibit varying electrical and structural properties along one or more directions thereof. The articles and structures may be used in electromagnetic interference (EMI) applications, applications in which reduction of multipath (e.g., reduction of multipath proximate antenna apertures) is desired, radome structures, in aircraft structures, aerospace structures, military vehicles, or other structures.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents.

What is claimed is:

1. An assembly comprising:
   a top face sheet;
   a bottom face sheet; and
   a core structure between the top face sheet and the bottom face sheet, the core structure comprising a plurality of cells, wherein structural elements of the core structure defining the plurality of cells exhibit at least one electrical property in at least one direction varying from the at least one electrical property in a second, different direction' and at least one structural property in the at least one direction varying from the at least one structural property in the second direction, wherein at least a portion of the structural elements comprises a radar absorbing structure, the structural elements comprising a matrix material and at least one additive dispersed in the matrix material, wherein the plurality of cells define a channel, a size of the cells of the plurality of cells increasing with a radial distance from the channel, and wherein the core structure comprises a plurality of layers, a first layer and third layer having a first pattern and a second layer between the first layer and the third layer having a mirror image of the first pattern.

2. The assembly of claim 1, wherein at least a portion of the structural elements exhibit a different radar absorbing capacity than at least another portion of the structural elements.

3. The assembly of claim 2, wherein at least a portion of the structural elements comprises metal particles dispersed in a matrix material and at least another portion of the structural elements comprises a carbon-containing material or a glass-containing material dispersed in the matrix material.

4. The assembly of claim 1, wherein the plurality of cells of at least one layer of the plurality of layers are laterally offset from the plurality of cells of at least another layer of the plurality of layers.

5. The assembly of claim 1, wherein at least one layer of the plurality of layers comprises a plurality of cells having a smaller cross-sectional area than the plurality of cells of at least another layer of the plurality of layers.

6. The assembly of claim 1, wherein at least one layer of the plurality of layers comprises a plurality of cells having a first shape and at least another layer of the plurality of layers comprises a plurality of cells having a second shape different from the first shape.

7. The assembly of claim 1, wherein at least one cell of the plurality of cells has a hexagonal cross-sectional shape.

8. The assembly of claim 1, wherein at least one cell of the plurality of cells has a triangular cross-sectional shape, a circular cross-sectional shape, a square cross- sectional shape, or a rectangular cross-sectional shape.

9. The assembly of claim 1, wherein the plurality of cells are coated or loaded with a radar absorbing material.

10. The assembly of claim 1, wherein the size of the cells of the plurality of cells is different at portions of the core structure distal from the top face sheet and the bottom face sheet than the size of the cells of the plurality of cells proximate the top face sheet or proximate the bottom face sheet.

11. The assembly of claim 1, wherein the at least one additive is selected from the group consisting of carbon nanotubes, carbon fibers, carbon black, glass fibers, metal nanoparticles, and nanostrands.

12. The assembly of claim 11, wherein the structural elements exhibit a varying concentration of the at least one additive along at least one axis thereof.

13. The assembly of claim 1, further comprising one or more of an antenna, a cable, a conduit, or one or more circuit elements within the channel.

14. The assembly of claim 1, wherein the core structure exhibits a void fraction varying in the at least one direction.

15. The assembly of claim 1, wherein the core structure exhibits radar absorption properties in a first direction and not in the second direction.

16. The assembly of claim 1, wherein a thickness of walls of the cells of the plurality of cells is between about 10 μm and about 200 μm.

17. The assembly of claim 1, further comprising:
a first coating comprising an electrically conductive coating on external surfaces of the core structure; and
a second coating on inner surfaces of the cells of the plurality of cells, the second coating exhibiting radar absorption properties.

18. The assembly of claim 1, further comprising:
a first coating exhibiting radar absorption properties on external surfaces of the core structure; and
a second coating comprising an electrically conductive coating on inner surfaces of the cells of the plurality of cells.

19. The assembly of claim 1, wherein the size of the cells of the plurality of cells varies in a first direction and a direction perpendicular to the first direction.

20. The assembly of claim 1, wherein the cells of the plurality of cells are filled with a metal foam comprising nickel or osmium.

21. The assembly of claim 1, wherein the at least one additive comprises carbon fibers, substantially all of the carbon fibers arranged in a parallel configuration within the core structure.

22. A method of fabricating a radar absorbing structure, the method comprising:
forming a first layer of a structure comprising a plurality of cells defined by structural elements,
the first layer having a first pattern, wherein the plurality of cells define a channel, a size of the cells of the plurality of cells increasing with a radial distance from the channel, forming the first layer comprising:
disposing a first filament segment comprising one or more additives dispersed in a matrix material on at least a portion of a platen; and
disposing a second filament segment comprising one or more additives dispersed in a matrix material on at least other portions of the platen, the second filament segment exhibiting different electrical properties than the first filament;
forming a second layer of the structure on the first layer, forming the second layer comprising:
disposing another segment of the first filament on at least a portion of the first layer; and
disposing another segment of the second filament on at least other portions of the first layer to form the structure comprising the plurality of cells, wherein the second layer is a mirror image of the first layer;
forming a third layer of the structure on the second layer, the third layer having the first pattern; and
disposing the structure between a top face sheet and a bottom face sheet, the top face sheet and the bottom face sheet exhibiting dielectric properties and at least a portion of the structural elements of the first layer and second layer exhibit radar absorbing properties;
wherein the structural elements comprise at least one structural property in at least one direction varying from the at least one structural property in a second, different direction' and at least one electrical property in the at least one direction varying from the at least one electrical property in the second direction.

23. The method of claim 22, further comprising forming a coating on at least some of the cells of the plurality of cells, the coating exhibiting radar absorbing properties.

24. The method of claim 22, wherein forming the second layer of the structure on the first layer comprises forming the structural elements of the second layer to exhibit different electrical properties than the structural elements of the first layer.

25. The method of claim 22, further comprising:
selecting the first filament to comprise the one or more additives selected from the group consisting of carbon nanotubes, carbon fibers, carbon black, glass fibers, metal nanoparticles, and nanostrands; and
selecting the second filament to comprise the one or more additives selected from the group consisting of carbon nanotubes, carbon fibers, carbon black, glass fibers, metal nanoparticles, and nanostrands.

26. A radar absorbing structure, the radar absorbing structure comprising:
- a top face sheet;
- a bottom face sheet; and
- a core between the top face sheet and the bottom face sheet, the core comprising a lattice structure comprising a plurality of cells arranged in a lattice, the cells of the plurality of cells defined by structural elements, wherein the structural elements exhibit at least one changing electrical property along at least one axis of the core and at least one changing structural property along at least one axis of the core, the structural elements comprising at least one additive material dispersed throughout a matrix material, wherein the plurality of cells define a channel, a size of the cells of the plurality of cells increasing with a radial distance from the channel, and wherein the core comprises a plurality of layers, a first layer and third layer having a first pattern and a second layer between the first layer and the third layer having a mirror image of the first pattern.

27. The radar absorbing structuring of claim 26, wherein a concentration of the at least one additive material varies along the at least one axis of the core.

28. The radar absorbing structure of claim 26, wherein the at least one additive material comprises fibers selected from the group consisting of carbon fibers, glass fibers, or a combination thereof, wherein substantially all of the carbon fibers are arranged in a parallel configuration within the core.

* * * * *

UNITED STATES PATENT AND TRADEMARK OFFICE
CERTIFICATE OF CORRECTION

PATENT NO. : 11,135,763 B2  
APPLICATION NO. : 15/969005  
DATED : October 5, 2021  
INVENTOR(S) : Beyerle et al.

Page 1 of 1

It is certified that error appears in the above-identified patent and that said Letters Patent is hereby corrected as shown below:

In the Specification

| | | |
|---|---|---|
| Column 3, | Line 57, | change "combinations thereof" to --combinations thereof.-- |
| Column 5, | Line 6, | change "axes thereof In" to --axes thereof. In-- |
| Column 5, | Line 8, | change "axes thereof In" to --axes thereof. In-- |
| Column 5, | Line 22, | change "combinations thereof In" to --combinations thereof. In-- |
| Column 9, | Line 52, | change "combinations thereof In" to --combinations thereof. In-- |
| Column 14, | Line 56, | change "directions thereof In" to --directions thereof. In-- |
| Column 15, | Line 45, | change "combinations thereof In" to --combinations thereof. In-- |
| Column 17, | Line 66, | change "portions thereof In" to --portions thereof. In-- |
| Column 18, | Line 43, | change "portions thereof In" to --portions thereof. In-- |

In the Claims

| | | | |
|---|---|---|---|
| Claim 1, | Column 24, | Line 55, | change "direction' and" to --direction and-- |
| Claim 8, | Column 25, | Line 29, | change "cross- sectional" to --cross-sectional-- |
| Claim 22, | Column 26, | Line 50, | change "direction' and" to --direction and-- |

Signed and Sealed this  
Twenty-third Day of November, 2021

Drew Hirshfeld  
*Performing the Functions and Duties of the  
Under Secretary of Commerce for Intellectual Property and  
Director of the United States Patent and Trademark Office*